(12) United States Patent
Yan et al.

(10) Patent No.: US 10,556,321 B2
(45) Date of Patent: Feb. 11, 2020

(54) SURFACE MODIFIED ABRASIVE PARTICLES, ABRASIVE ARTICLES AND METHODS OF FORMING THEREOF

(71) Applicant: SAINT-GOBAIN CERAMICS & PLASTICS, INC., Worcester, MA (US)

(72) Inventors: Aiyu Yan, Shanghai (CN); Wen Yang, Shanghai (CN); Pinxu Nie, Shanghai (CN); Shuqiong Liang, Shanghai (CN)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 50 days.

(21) Appl. No.: 16/013,092

(22) Filed: Jun. 20, 2018

(65) Prior Publication Data

US 2018/0369991 A1    Dec. 27, 2018

Related U.S. Application Data

(60) Provisional application No. 62/526,714, filed on Jun. 29, 2017.

(30) Foreign Application Priority Data

Jun. 21, 2017  (CN) .......................... 2017 1 0473836

(51) Int. Cl.
*B24D 3/34*  (2006.01)
*B24D 3/20*  (2006.01)
(Continued)

(52) U.S. Cl.
CPC .............. *B24D 3/346* (2013.01); *B24D 3/20* (2013.01); *C08G 65/38* (2013.01); *C08K 3/22* (2013.01);
(Continued)

(58) Field of Classification Search
CPC . B24D 3/346; B24D 3/00; B24D 3/20; C08G 65/38; C08K 3/22; C08K 9/04; C08K 2003/2227; C08K 2003/2244
See application file for complete search history.

(56) References Cited

U.S. PATENT DOCUMENTS

| | | | |
|---|---|---|---|
| 4,871,376 A | 10/1989 | DeWald | |
| 2003/0024169 A1* | 2/2003 | Kendall | B24D 3/346 51/297 |

(Continued)

FOREIGN PATENT DOCUMENTS

| | | |
|---|---|---|
| CN | 102672599 A | 9/2012 |
| CN | 103606660 A | 2/2014 |

(Continued)

OTHER PUBLICATIONS

Mondin et al., "Investigations of mussel-inspired polydopamine deposition on WC and Al2O3 particles: The influence of particle size and material," Materials Chemistry and Physics, 2014, pp. 624-630, vol. 148, No. 3. ((abstract only)).

(Continued)

*Primary Examiner* — Pegah Parvini
(74) *Attorney, Agent, or Firm* — Abel Schillinger, LLP; Adrian Lawrence

(57) ABSTRACT

A surface modified abrasive particle may include a core abrasive particle and a coating functionally connected to a surface of the core abrasive particle. The core abrasive particle may have a median particle size of at least about 0.06 microns. The coating may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

20 Claims, 13 Drawing Sheets

(51) Int. Cl.
  *C09K 3/14* (2006.01)
  *C08K 9/04* (2006.01)
  *C08K 3/22* (2006.01)
  *C08G 65/38* (2006.01)

(52) U.S. Cl.
  CPC .............. *C08K 9/04* (2013.01); *C09K 3/1436* (2013.01); *C08K 2003/2227* (2013.01); *C08K 2003/2244* (2013.01)

(56) References Cited

U.S. PATENT DOCUMENTS

| | | | |
|---|---|---|---|
| 2006/0142773 A1* | 6/2006 | Sengun | A61B 17/1644 606/79 |
| 2014/0179941 A1 | 6/2014 | Bao | |
| 2015/0099824 A1 | 4/2015 | Martin et al. | |
| 2015/0221935 A1* | 8/2015 | Zhou | H01M 4/581 429/213 |
| 2015/0322294 A1* | 11/2015 | Onishi | H01L 21/3212 451/59 |
| 2016/0220708 A1* | 8/2016 | Bian | C12N 15/87 |
| 2016/0311080 A1 | 10/2016 | Woo et al. | |

FOREIGN PATENT DOCUMENTS

| | | |
|---|---|---|
| CN | 103909476 A | 7/2014 |
| CN | 104788701 A | 7/2015 |
| CN | 106752830 A | 5/2017 |
| KR | 20160073036 A | 6/2016 |
| TW | 201520280 A | 6/2015 |
| TW | 201542780 A | 11/2015 |
| TW | 201600589 A | 1/2016 |

OTHER PUBLICATIONS

International Search Report & Written Opinion for PCT/US2018/038448, dated Oct. 26, 2018, 10 pages.

* cited by examiner

SURFACE MODIFIED ABRASIVE PARTICLES, ABRASIVE ARTICLES AND METHODS OF FORMING THEREOF

CROSS-REFERENCE TO RELATED APPLICATION(S)

This application claims priority to Chinese Application No. 201710473836.7, filed Jun. 21, 2017, entitled "SURFACE MODIFIED ABRASIVE PARTICLES, ABRASIVE ARTICLES AND METHODS OF FORMING THEREOF," by Aiyu Y A N et al., and claims priority under 35 U.S.C. § 119(e) to U.S. Provisional Patent Application No. 62/526,714, filed Jun. 29, 2017, entitled "SURFACE MODIFIED ABRASIVE PARTICLES, ABRASIVE ARTICLES AND METHODS OF FORMING THEREOF", by Aiyu Y A N et al., which applications are assigned to the current assignee hereof and incorporated by reference herein in their entireties.

FIELD OF THE DISCLOSURE

The following is directed to surface modified abrasive particles, an organic bond composite that includes surface modified abrasive particle, an abrasive article the includes surface modified abrasive particle and methods of forming the same.

DESCRIPTION OF THE RELATED ART

Abrasive particles and bond material are common components of abrasive articles. In particular, abrasive particles and organic bonded material are common components of organic bonded abrasive articles. The interaction between the abrasive particles and the organic bond materials, i.e. the bond strength between the abrasive particles and the organic bond, has a direct impact on the performance of an abrasive article. Accordingly, the industry continues to demand improved abrasive particles with surface characteristics that increase the potential bond strength between the abrasive particles and organic bond material.

SUMMARY

According to a first aspect, a surface modified abrasive particle may include a core abrasive particle and a coating functionally connected to a surface of the core abrasive particle. The core abrasive particle may have a median particle size of at least about 0.06 microns. The coating may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

According to yet another aspect, an organic bond composite may include an organic bond component and a surface modified abrasive particle dispersed within the organic bond component. The surface modified abrasive particle may include a core abrasive particle and a coating functionally connected to a surface of the core abrasive particle. The core abrasive particle may have a median particle size of at least about 0.06 microns. The coating may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

According to still another aspect, a method of forming an organic bond composite may include providing an unprocessed organic bond component, providing a surface modified abrasive particle, and combining the unprocessed organic bond component with the surface modified abrasive particle to form the organic bond composite. The surface modified abrasive particle may include a core abrasive particle and a coating functionally connected to a surface of the core abrasive particle. The core abrasive particle may have a median particle size of at least about 0.06 microns. The coating may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

According to still another aspect, an abrasive article may include an organic bond component and a surface modified abrasive particle dispersed within the organic bond component. The surface modified abrasive particle may include a core abrasive particle and a coating functionally connected to a surface of the core abrasive particle. The core abrasive particle may have a median particle size of at least about 0.06 microns. The coating may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

According to still another aspect, a method of forming an abrasive article may include providing an unprocessed organic bond component, providing a surface modified abrasive particle, and combining the unprocessed organic bond component with the surface modified abrasive particle to form the abrasive article. The surface modified abrasive particle may include a core abrasive particle and a coating functionally connected to a surface of the core abrasive particle. The core abrasive particle may have a median particle size of at least about 0.06 microns. The coating may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

According to another aspect, a surface modified abrasive particle may include a core abrasive particle and a dopamine coating functionally connected to a surface of the core abrasive particle. The core abrasive particle may have a median particle size of at least about 0.06 microns.

According to yet another aspect, an organic bond composite may include an organic bond component and a surface modified abrasive particle dispersed within the organic bond component. The surface modified abrasive particle may include a core abrasive particle and a dopamine coating functionally connected to a surface of the core abrasive particle. The core abrasive particle may have a median particle size of at least about 0.06 microns.

According to still another aspect, a method of forming an organic bond composite may include providing an unprocessed organic bond component, providing a surface modified abrasive particle, and combining the unprocessed organic bond component with the surface modified abrasive particle to form the organic bond composite. The surface modified abrasive particle may include a core abrasive particle and a dopamine coating functionally connected to a surface of the core abrasive particle. The core abrasive particle may have a median particle size of at least about 0.06 microns.

According to still another aspect, an abrasive article may include an organic bond component and a surface modified abrasive particle dispersed within the organic bond component. The surface modified abrasive particle may include a core abrasive particle and a dopamine coating functionally connected to a surface of the core abrasive particle. The core abrasive particle may have a median particle size of at least about 0.06 microns.

According to still another aspect, a method of forming an abrasive article may include providing an unprocessed organic bond component, providing a surface modified abrasive particle, and combining the unprocessed organic bond component with the surface modified abrasive particle to form the abrasive article. The surface modified abrasive particle may include a core abrasive particle and a dopamine coating functionally connected to a surface of the core abrasive particle. The core abrasive particle may have a median particle size of at least about 0.06 microns.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following is directed to surface modified abrasive particles, an organic bond composite that includes surface modified abrasive particles, an abrasive article the includes surface modified abrasive particles and methods of forming the same.

Figure 1:
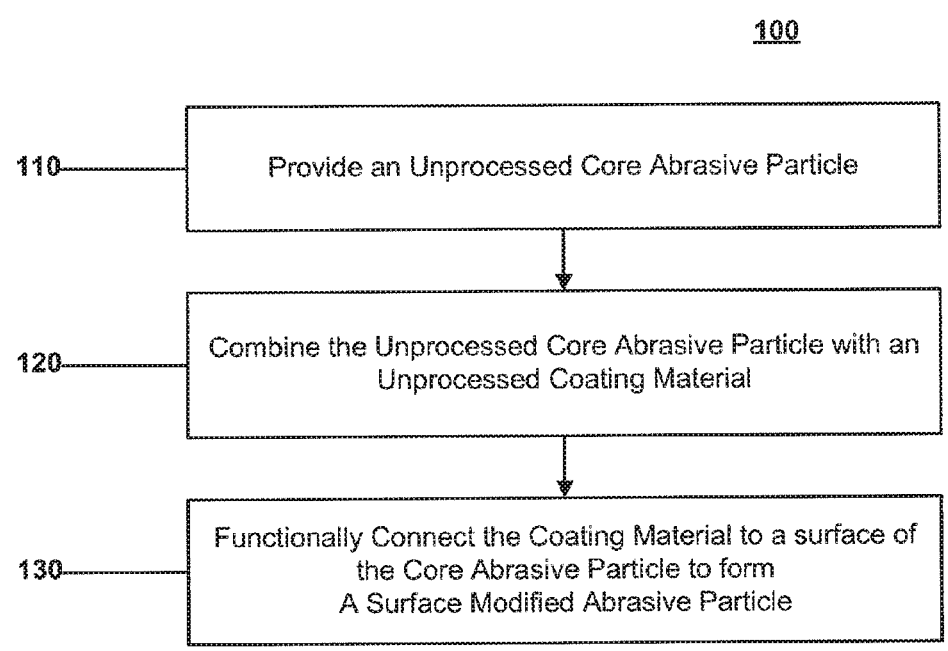
FIG. 1 includes an illustration of a flow diagram of a process for forming a surface modified abrasive particle according to embodiments described herein.

Referring first to methods of forming a surface modified abrasive particle, FIG. 1 illustrates an abrasive particle surface modification process 100. Abrasive particle surface modification process 100 may include a first step 110 of providing an unprocessed core abrasive particle, a second step 120 of combining the unprocessed core abrasive particle with a unprocessed coating material and a third step 130 of functionally connecting the unprocessed coating material to a surface of the unprocessed core abrasive particle to form the surface modified abrasive particle.

According to certain embodiments, the abrasive particle surface modification process 100 may include modifying the surface of any unprocessed core abrasive particle suitable for surface modification according to embodiments described herein.

Referring to the first step 110, the unprocessed core abrasive particle may include a particular material. For example, the unprocessed core abrasive particle may include alumina, zirconia, oxides, carbides, nitrides, borides, diamond, superabrasives, white alundum, brown alundum, microcrystalline alumina abrasive, fused alumina zirconia, silicon carbide, boron carbide, boron nitride, silica or any combinations thereof. According to still other embodiments, the core abrasive particle may consist of a particular material. For example, the unprocessed core abrasive particle may consist of alumina, zirconia, oxides, carbides, nitrides, borides, diamond, superabrasives, white alundum, brown alundum, microcrystalline alumina abrasive, fused alumina zirconia, silicon carbide, boron carbide, boron nitride, silica or any combinations thereof.

According to still other embodiments, the unprocessed core abrasive particle may include alumina. According to yet other embodiments, the unprocessed core abrasive particle may consist essentially of alumina. According to still other embodiments, the unprocessed core abrasive particle may include zirconia. According to yet other embodiments, the unprocessed core abrasive particle may consist essentially of zirconia. According to other embodiments, the unprocessed core abrasive particle may include alumina and zirconia. According to still other embodiments, the unprocessed core abrasive particle may consist essentially of alumina and zirconia.

According to still other embodiments, the unprocessed core abrasive particle may include a particular content of alumina. For example, the unprocessed core abrasive particle may include For example, the unprocessed core abrasive particle may include at least 1 wt. % alumina for a total weight of the unprocessed core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. %. According to still other embodiments, the unprocessed core abrasive particle may include not greater than 99 wt. % alumina for the total weight of the unprocessed core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %. It will be appreciated that the content of alumina in the unprocessed core abrasive particle may be any value between any of minimum and maximum values noted above. It will be further appreciated that the content of alumina in the unprocessed core abrasive particle may be within a range between any of the minimum and maximum values noted above.

According to still other embodiments, the unprocessed core abrasive particle may include a particular content of zirconia. For example, the unprocessed core abrasive particle may include For example, the core abrasive particle may include at least 1 wt. % zirconia for a total weight of the unprocessed core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. %. According to still other embodiments, the unprocessed core abrasive particle may include not greater than 99 wt. % zirconia for the total weight of the unprocessed core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %. It will be appreciated that the content of zirconia in the unprocessed core abrasive particle may be any value between any of minimum and maximum values noted above. It will be further appreciated that the content of zirconia in the unprocessed core abrasive particle may be within a range between any of the minimum and maximum values noted above.

According to yet other embodiments, the unprocessed core abrasive particle may be substantially free of particular materials. For purposes of embodiments described herein, the phrase "substantially free" may indicate that the content of a given material is sufficiently low such that the material does not alter any properties, physically or chemically, of the unprocessed core abrasive particle. According to certain embodiments, the unprocessed core abrasive particle may be substantially free of nitrides. According to still other embodiments, the unprocessed core abrasive particle may be substantially free of borides. According to yet other embodiments, the unprocessed core abrasive particle may be substantially free of any combination of nitrides and borides. According to still other embodiments, the unprocessed core abrasive particle may be substantially free of metals. According to yet other embodiments, the unprocessed core abrasive particle may be substantially free of metal alloys. According to other embodiments, the unprocessed core abrasive particle may be substantially free of any combination of metals and metal alloys.

According to yet other embodiments, the unprocessed core abrasive particle may have a particular median particle size (D50). For example, the unprocessed core abrasive particle may have a median particle size (D50) of at least 0.6 microns or at least about 1 microns or at least 5 microns or at least 10 microns or at least 20 microns or at least 50 microns or at least 80 microns or at least 100 microns or at least 200 microns or at least 500 microns or at least 1000 microns or at least 2000 microns or at least 3000 microns or at least 4000 microns or at least 5000 microns or at least 10000 microns or at least 20000 microns or at least 30000 microns. According to still other embodiments, the unprocessed core abrasive particle may have a median particle size (D50) of not greater than 40000 microns or not greater than 30000 microns or not greater than 20000 microns or not greater than 10000 microns or not greater than 5000 microns or not greater than 4000 microns or not greater than 3000 microns or not greater than 2000 microns or not greater than 1000 microns or not greater than 500 microns or not greater than 200 microns or not greater than 100 microns or not greater than 80 microns or not greater than 50 microns or not greater than 20 microns or not greater than 10 microns. It will be appreciated that the median particle size (D50) of the unprocessed core abrasive particle may be any value between any of minimum and maximum values noted above. It will be further appreciated that the median particle size (D50) of the unprocessed core abrasive particle may be within a range between any of the minimum and maximum values noted above.

Referring to second step 120, the unprocessed coating material may include a particular compound. For example, the unprocessed coating material may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof. According to still other embodiments, the unprocessed coating material may consist of a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

According to still other embodiments, the unprocessed coating material may be an unprocessed dopamine coating material.

According to still other embodiments, the unprocessed dopamine coating material may be a polymerized dopamine, such as, for example, polydopamine.

According to still other embodiments, the unprocessed coating material and the unprocessed core abrasive particle may be combined so that the unprocessed coating material covers a particular percentage of the unprocessed core abrasive particle. For example, the unprocessed coating material may cover at least 1% of an outer surface of the unprocessed core abrasive particle or at least 2% or at least 3% or at least 4% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% or at least 96% or at least 97% or at least 98% or at least 99%. According to yet other embodiments, the unprocessed coating material may cover not greater than 99% of an outer surface of the core abrasive particle or not greater than 98% or not greater than 97% or not greater than 96% or not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10%. It will be appreciated that the percentage of the surface of the unprocessed core abrasive particle covered by the unprocessed coating material may be any value between any of minimum and maximum values noted above. It will be further appreciated that the percentage of the surface of the unprocessed core abrasive particle covered by the unprocessed coating material may be within a range between any of the minimum and maximum values noted above. The percent surface coverage may be calculated by capturing a SEM image of the covered particle and then analyzing the image using an image analysis software, such as, Image J software.

According to yet other embodiments, the unprocessed coating material and the unprocessed core abrasive particle may be combined so that the unprocessed coating material is present in a particular amount of the total weight of the combination of the unprocessed core abrasive particle and the unprocessed coating mater. For example, the unprocessed coating material is present in an amount of at least 0.05 wt. % of the weight of the combination of the unprocessed core abrasive particle and the unprocessed coating material or at least 0.06 wt. % or at least 0.07 wt. % or at least 0.08 wt. % or at least 0.09 wt. % or at least 0.1 wt. % or at least 0.5 wt. % or at least 1 wt. % or at least 1.5 wt. % or at least 2 wt. % or at least 2.5 wt. % or at least 3 wt. % or at least 4 wt. % or at least 5 wt. % or at least 6 wt. % or at least 7 wt. % or at least 8 wt. % or at least 9 wt. %. According to yet other embodiments, the unprocessed coating material is present in an amount of not greater than 10 wt. % of the total weight of the combination of the unprocessed core abrasive particle and the unprocessed coating material or not greater than 9 wt. % or not greater than 8 wt. % or not greater than 7 wt. % or not greater than 6 wt. % or not greater than 5 wt. % or not greater than 4 wt. % or not greater than 3 wt. % or not greater than 2 wt. % or not greater than 1.5 wt. % or not greater than 1 wt. %. It will be appreciated that the amount of unprocessed coating material in the combination of the unprocessed core abrasive particle and the unprocessed coating material may be any value between any of minimum and maximum values noted above. It will be further appreciated that the amount of unprocessed coating material in the combination of the unprocessed core abrasive particle and the unprocessed coating material may be within a range between any of the minimum and maximum values noted above.

Referring again to the second step 120, combining the unprocessed core abrasive particle with an unprocessed coating material may further include preparing a solution of an unprocessed coating material as described herein in a solvent. It will be appreciated that the solvent may be any solvent capable of dissolving an unprocessed coating material for application on the surface of the core abrasive particle.

According to yet other embodiments, the solution may have a particular concentration of unprocessed coating material. For example, the concentration of unprocessed coating material in the solution may be at least about 0.05 g/L or at least about 0.1 g/L or at least about 0.5 g/L or at least about1.0 g/L or at least about 2.0 g/L or at least about 3.0 g/L or at least about 4.0 g/L or at least about 5.0 g/L or at least about 6.0 g/L or at least about 7.0 g/L or at least about 8.0 g/L or at least about 9.0 g/L. According to yet other embodiments, the concentration of the unprocessed coating material in the solution may be not greater than about 50 g/L or not greater than about 45 g/L or not greater than about 40 g/L or not greater than about 35 g/L or not greater than about 30 g/L or not greater than about 25 g/L or not greater than about 20 g/L or not greater than about 15 g/L or not greater than about 14 g/L or not greater than about 13 g/L or not greater than about 12 g/L or not greater than about 11 g/L. It will be appreciated that dip coating the core abrasive particle may include submerging the core abrasive particle in the solution for any number of hours between any of minimum and maximum values noted above. It will be further appreciated that dip coating the core abrasive particle may include submerging the core abrasive particle in the solution for any number of hours within a range between any of the minimum and maximum values noted above.

According to still other embodiments, combining the unprocessed core abrasive particle with an unprocessed coating material may further include treating the surface of the surface of the unprocessed core abrasive particle with the solution that includes the unprocessed coating material. According to certain embodiments, treating the surface of the unprocessed core abrasive particles with the solution may include any treating process, such as, dip coating the unprocessed core abrasive particles in the solution or spray coating the core abrasive particle with the solution.

According to other particular embodiments, dip coating the unprocessed core abrasive particles may include submerging the unprocessed core abrasive particle in the solution for a particular number of hours. For example, dip coating the unprocessed core abrasive particle may include submerging the unprocessed core abrasive particle in the solution for at least about 2 hours or at least about 5 hours or at least about 10 hours or at least about 15 hours or at least about 24 hours. According to still other embodiments, dip coating the unprocessed core abrasive particle may include submerging the unprocessed core abrasive particle in the solution for not greater than about 72 hours or not greater than about 48 hours or not greater than about 36 hours. It will be appreciated that dip coating the unprocessed core abrasive particle may include submerging the unprocessed core abrasive particle in the solution for any number of hours between any of minimum and maximum values noted above. It will be further appreciated that dip coating the unprocessed core abrasive particle may include submerging the unprocessed core abrasive particle in the solution for any number of hours within a range between any of the minimum and maximum values noted above.

Referring to the third step 130, functionally connecting the unprocessed coating material to a surface of the unprocessed core abrasive particle may include forming a particular connection between the unprocessed coating material and the unprocessed core abrasive particle. For example, functionally connecting the unprocessed coating material to a surface of the unprocessed core abrasive particle may include creating covalent bonds between the unprocessed coating material and the surface of the unprocessed core abrasive particle. According to still other embodiments, functionally connecting the unprocessed coating material to a surface of the unprocessed core abrasive particle may include creating hydrogen bonds between the unprocessed coating material and the unprocessed surface of the core abrasive particle. According to yet other embodiments, functionally connecting the unprocessed coating material to a surface of the unprocessed core abrasive particle may include complexing at least one catechol group from the unprocessed coating material with metal ions from the unprocessed core abrasive particle. According to still other embodiments, functionally connecting the unprocessed coating material to a surface of the unprocessed core abrasive particle may include any combination of creating covalent bonds between the unprocessed coating material and the surface of the unprocessed core abrasive particle, creating hydrogen bonds between the unprocessed coating material and the surface of the unprocessed core abrasive particle and complexing at least one catechol group from the unprocessed coating material with metal ions from the unprocessed core abrasive particle.

According to still other embodiments, functionally connecting the unprocessed coating material to a surface of the unprocessed core abrasive particle may include covalently bonding the unprocessed coating material to the surface of the unprocessed core abrasive particle via at least one oxygen linkage. According to yet other embodiments, functionally connecting the unprocessed coating material to a surface of the unprocessed core abrasive particle may include covalently bonding the coating material to the surface of the core abrasive particle via at least one NH linkage.

According to yet other embodiments, the abrasive particle surface modification process 100 may further include filtering the surface modified abrasive particle.

According to still other embodiments, the abrasive particle surface modification process 100 may further include washing the surface modified abrasive particle.

According to yet other embodiments, the abrasive particle surface modification process 100 may further include drying the surface modified abrasive particle.

Referring now to a surface modified abrasive particle formed according to embodiments described herein, the surface modified abrasive particle may include a core abrasive particle functionally connected to a coating material.

According to particular embodiments, the core abrasive particle of a surface modified abrasive particle formed according to embodiments described herein may include a particular material. For example, the core abrasive particle may include alumina, zirconia, oxides, carbides, nitrides, borides, diamond, superabrasives, white alundum, brown alundum, microcrystalline alumina abrasive, fused alumina zirconia, silicon carbide, boron carbide, boron nitride, silica or any combinations thereof. According to still other embodiments, the core abrasive particle may consist of a particular material. For example, the core abrasive particle may consist of alumina, zirconia, oxides, carbides, nitrides, borides, diamond, superabrasives, white alundum, brown alundum, microcrystalline alumina abrasive, fused alumina zirconia, silicon carbide, boron carbide, boron nitride, silica or any combinations thereof.

According to still other embodiments, the core abrasive particle of a surface modified abrasive particle formed according to embodiments described herein may include alumina. According to yet other embodiments, the core abrasive particle may consist essentially of alumina. According to still other embodiments, the core abrasive particle may include zirconia. According to yet other embodiments, the core abrasive particle may consist essentially of zirconia. According to other embodiments, the core abrasive particle may include alumina and zirconia. According to still other embodiments, the core abrasive particle may consist essentially of alumina and zirconia.

According to still other embodiments, the core abrasive particle of a surface modified abrasive particle formed according to embodiments described herein may include a particular content of alumina. For example, the core abrasive particle may include For example, the core abrasive particle may include at least 1 wt. % alumina for a total weight of the core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. %. According to still other embodiments, the core abrasive particle may include not greater than 99 wt. % alumina for the total weight of the core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %. It will be appreciated that the content of alumina in the core abrasive particle may be any value between any of minimum and maximum values noted above. It will be further appreciated that the content of alumina in the core abrasive particle may be within a range between any of the minimum and maximum values noted above.

According to still other embodiments, the core abrasive particle of a surface modified abrasive particle formed according to embodiments described herein may include a particular content of zirconia. For example, the core abrasive particle may include For example, the core abrasive particle may include at least 1 wt. % zirconia for a total weight of the core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. %. According to still other embodiments, the unprocessed core abrasive particle may include not greater than 99 wt. % zirconia for the total weight of the core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %. It will be appreciated that the content of zirconia in the core abrasive particle may be any value between any of minimum and maximum values noted above. It will be further appreciated that the content of zirconia in the core abrasive particle may be within a range between any of the minimum and maximum values noted above.

According to yet other embodiments, the core abrasive particle of a surface modified abrasive particle formed according to embodiments described herein may be substantially free of particular materials. For purposes of embodiments described herein, the phrase "substantially free" may indicate that the content of a given material is sufficiently low such that the material can not alter any properties, physically or chemically, of the core abrasive particle. According to certain embodiments, the core abrasive particle may be substantially free of nitrides. According to still other embodiments, the core abrasive particle may be substantially free of borides. According to yet other embodiments, the core abrasive particle may be substantially free of any combination of nitrides and borides. According to still other embodiments, the core abrasive particle may be substantially free of metals. According to yet other embodiments, the core abrasive particle may be substantially free of metal alloys. According to other embodiments, the core abrasive particle may be substantially free of any combination of metals and metal alloys.

According to yet other embodiments, the core abrasive particle of a surface modified abrasive particle formed according to embodiments described herein may have a particular median particle size (D50). For example, the core abrasive particle may have a median particle size (D50) of at least 0.6 microns or at least about 1 microns or at least 5 microns or at least 10 microns or at least 20 microns or at least 50 microns or at least 80 microns or at least 100 microns or at least 200 microns or at least 500 microns or at least 1000 microns or at least 2000 microns or at least 3000 microns or at least 4000 microns or at least 5000 microns or at least 10000 microns or at least 20000 microns or at least 30000 microns. According to still other embodiments, the core abrasive particle may have a median particle size (D50) of not greater than 40000 microns or not greater than 30000 microns or not greater than 20000 microns or not greater than 10000 microns or not greater than 5000 microns or not greater than 4000 microns or not greater than 3000 microns or not greater than 2000 microns or not greater than 1000 microns or not greater than 500 microns or not greater than 200 microns or not greater than 100 microns or not greater than 80 microns or not greater than 50 microns or not greater than 20 microns or not greater than 10 microns. It will be appreciated that the median particle size (D50) of the unprocessed core abrasive particle may be any value between any of minimum and maximum values noted above. It will be further appreciated that the median particle size (D50) of the core abrasive particle may be within a range between any of the minimum and maximum values noted above.

According to yet other embodiments, the coating material of a surface modified abrasive particle formed according to embodiments described herein may include a particular compound. For example, the coating material may include a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof. According to still other embodiments, the coating material may consist of a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

According to still other embodiments, the coating material may be a dopamine coating material.

According to yet other embodiments, the dopamine coating material may be a polymerized dopamine, such as, for example, polydopamine.

According to still other embodiments, the coating material may be a tannic acid coating material.

According to still other embodiments, the coating material may be a pyrogallic acid coating material.

According to still other embodiments, the coating material of a surface modified abrasive particle formed according to embodiments described herein may cover a particular percentage of the core abrasive particle. For example, the coating material may cover at least 1% of an outer surface of the core abrasive particle or at least 2% or at least 3% or at least 4% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% or at least 96% or at least 97% or at least 98% or at least 99%. According to yet other embodiments, the coating material may cover not greater than 99% of an outer surface of the core abrasive particle or not greater than 98% or not greater than 97% or not greater than 96% or not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10%. It will be appreciated that the percentage of the surface of the core abrasive particle covered by the coating material may be any value between any of minimum and maximum values noted above. It will be further appreciated that the percentage of the surface of the core abrasive particle covered by the coating material may be within a range between any of the minimum and maximum values noted above.

According to yet other embodiments, the coating material of a surface modified abrasive particle formed according to embodiments described herein may be present in a particular amount of the total weight of the surface modified abrasive particle formed according to embodiments described herein. For example, the coating material is present in an amount of at least 0.05 wt. % of the weight of the surface modified abrasive particle formed according to embodiments described herein including the core abrasive particle and the coating material or at least 0.06 wt. % or at least 0.07 wt. % or at least 0.08 wt. % or at least 0.09 wt. % or at least 0.1 wt. % or at least 0.5 wt. % or at least 1 wt. % or at least 1.5 wt. % or at least 2 wt. % or at least 2.5 wt. % or at least 3 wt. % or at least 4 wt. % or at least 5 wt. % or at least 6 wt. % or at least 7 wt. % or at least 8 wt. % or at least 9 wt. %. According to yet other embodiments, the coating material is present in an amount of not greater than 10 wt. % of the total weight of the surface modified abrasive particle formed according to embodiments described herein including the core abrasive particle and the coating material or not greater than 9 wt. % or not greater than 8 wt. % or not greater than 7 wt. % or not greater than 6 wt. % or not greater than 5 wt. % or not greater than 4 wt. % or not greater than 3 wt. % or not greater than 2 wt. % or not greater than 1.5 wt. % or not greater than 1 wt. %. It will be appreciated that the amount of coating material in the surface modified abrasive particle formed according to embodiments described herein may be any value between any of minimum and maximum values noted above. It will be further appreciated that the amount of coating material in the surface modified abrasive particle formed according to embodiments described herein may be within a range between any of the minimum and maximum values noted above.

Figure 2:
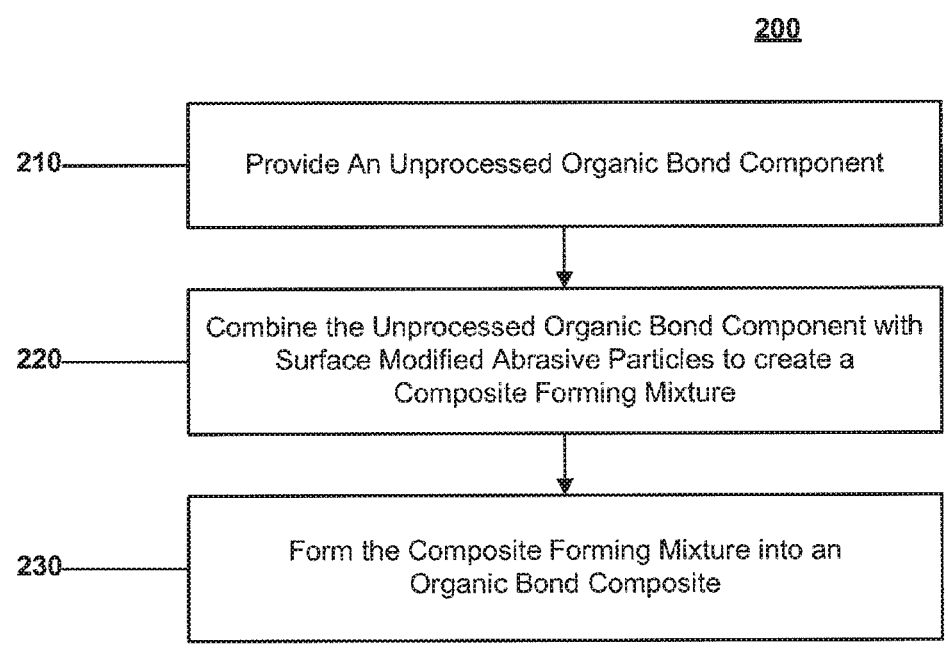
FIG. 2 includes an illustration of a flow diagram of a process for forming an organic bond composite that includes surface modified abrasive particles according to embodiments described herein.

Referring now to methods of forming an organic bond composite including surface modified abrasive particles, FIG. 2 illustrates an organic bond composite forming process 200. Organic bond composite forming process 200 may include a first step 210 of providing at least one unprocessed organic bond component, a second step 220 of combining the unprocessed organic bond component with surface modified abrasive particles to create a composite forming mixture and a third step 230 of forming the composite forming mixture into an organic bond composite.

Referring to first step 210, according to certain embodiments, the unprocessed organic bond component may include particular organic materials. For example, the unprocessed organic bond component may include any organic component suitable for provide structural strength during formation of the organic bond composite. According to particular embodiments, the unprocessed organic bond component may include any organic material. For example, the organic material can be a material such as a thermoset, thermoplastic, adhesive and a combination thereof. According to still other embodiments, the organic material of the unprocessed organic bond component may include a material such as polyimides, polyamides, resins, aramids, epoxies, polyesters, polyurethanes, acetates, celluloses, and a combination thereof. In still other embodiments, the unprocessed bond component may include a binder material utilizing a combination of a thermoplastic material configured to cure at a particular temperature. In still other embodiments, the unprocessed bond component may include an adhesive material suitable for facilitating attachment between other components of the mixture, for example, the surface modified abrasive particles. According to particular embodiments, the unprocessed bond component may be in the form of a liquid, including for example, an aqueous-based or non-aqueous-based compound.

According to certain embodiments, the unprocessed organic bond component may be present in a relative minor amount (by weight) within the composite forming mixture. For example, the unprocessed organic bond component may be present in amount less than the amount of the surface modified abrasive grains. For example, the composite forming mixture may include not greater than about 50 wt. % unprocessed organic bond component for a total weight of the composite forming mixture or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. % or not greater than about 28 wt. % or not greater than about 25 wt. %. According to still other embodiments, the composite forming mixture may include at least about 5 wt. % unprocessed organic bond component for a total weigh of the composite forming mixture or at least about 7 wt. % or at least about 10 wt. % or at least about 12 wt. % or at least about 15 wt. % or at least about 17 wt. % or at least about 20 wt. % or at least about 22 wt. %. It will be appreciated that the amount of unprocessed organic bond component in the composite forming mixture may be any value between any of minimum and maximum values noted above. It will be further appreciated that the amount of unprocessed organic bond component in the composite forming mixture may be within a range between any of the minimum and maximum values noted above.

Referring to second step 220, according to particular embodiments, the surface modified abrasive particles may be formed according to any embodiments described herein and may include a core abrasive particle functionally connected to a coating material. It will be appreciated that the surface modified abrasive particle combined with the unprocessed organic bond component may further include any components or characteristics described herein with reference to a surface modified abrasive particle.

According to certain embodiments, the surface modified abrasive particles may be present in a particular amount within the composite forming mixture. For example, the composite forming mixture may include not greater than about 90 wt. % surface modified abrasive particles for a total weight of the composite forming mixture or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or not greater than about 70 wt. % or not greater than about 68 wt. % or not greater than about 65 wt. %. According to still other embodiments, the composite forming mixture may include at least about 55 wt. % surface modified abrasive particles for a total weigh of the composite forming mixture or at least about 57 wt. % or at least about 60 wt. % or at least about 62 wt. % or at least about 65 wt. % or at least about 67 wt. % or at least about 70 wt. % or at least about 72 wt. %. It will be appreciated that the amount of surface modified abrasive particles in the composite forming mixture may be any value between any of minimum and maximum values noted above. It will be further appreciated that the amount of surface modified abrasive particles in the composite forming mixture may be within a range between any of the minimum and maximum values noted above.

Referring to third step 230, forming the mixture into an organic bond composite may include any method of curing or sintering the unprocessed organic bond to solidify it within the composite.

Referring now to the organic bond composite formed according to embodiments described herein, the organic bond composite may include at least one organic bond component and a surface modified abrasive particle within the organic bond component.

According to certain embodiments, the organic bond component of the organic bond composite formed according to embodiments described herein may include particular organic materials. For example, the organic bond component may include any organic component suitable for provide structural strength to the organic bond composite formed according to embodiments described herein. According to particular embodiments, the organic bond component may include any organic material. For example, the organic material can be a material such as a thermoset, thermoplastic, adhesive and a combination thereof. According to still other embodiments, the organic material of the organic bond component may include a material such as polyimides, polyamides, resins, aramids, epoxies, polyesters, polyurethanes, acetates, celluloses, and a combination thereof. In still other embodiments, the bond component may include a binder material utilizing a combination of a thermoplastic material configured to cure at a particular temperature. In still other embodiments, the bond component may include an adhesive material suitable for facilitating attachment between other components of the mixture, for example, the surface modified abrasive particles.

According to certain embodiments, the organic bond component may be present in a relative minor amount (by weight) of the organic bond composite formed according to embodiments described herein. For example, the organic bond component may be present in amount less than the amount of the surface modified abrasive grains. For example, the organic bond composite formed according to embodiments described herein may include not greater than about 50 wt. % organic bond component for a total weight of the organic bond composite or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. % or not greater than about 28 wt. % or not greater than about 25 wt. %. According to still other embodiments, the organic bond composite formed according to embodiments described herein may include at least about 5 wt. % organic bond component for a total weigh of the organic bond component or at least about 7 wt. % or at least about 10 wt. % or at least about 12 wt. % or at least about 15 wt. % or at least about 17 wt. % or at least about 20 wt. % or at least about 22 wt. %. It will be appreciated that the amount of organic bond component in the organic bond composite may be any value between any of minimum and maximum values noted above. It will be further appreciated that the amount of organic bond component in the organic bond composite may be within a range between any of the minimum and maximum values noted above.

According to particular embodiments, the surface modified abrasive particles may be formed according to any embodiments described herein and may include a core abrasive particle functionally connected to a coating material. It will be appreciated that the surface modified abrasive particle combined with the unprocessed organic bond component may further include any components or characteristics described herein with reference to a surface modified abrasive particle.

According to certain embodiments, the surface modified abrasive particles may be present in a particular amount of the organic bond composite formed according to embodiments described herein. For example, the of the organic bond composite formed according to embodiments described herein may include not greater than about 90 wt. % surface modified abrasive particles for a total weight of the organic bond composite or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or not greater than about 70 wt. % or not greater than about 68 wt. % or not greater than about 65 wt. %. According to still other embodiments, the organic bond composite formed according to embodiments described herein may include at least about 55 wt. % surface modified abrasive particles for a total weigh of the organic bond composite or at least about 57 wt. % or at least about 60 wt. % or at least about 62 wt. % or at least about 65 wt. % or at least about 67 wt. % or at least about 70 wt. % or at least about 72 wt. %. It will be appreciated that the amount of surface modified abrasive particles in the organic bond composite formed according to embodiments described herein may be any value between any of minimum and maximum values noted above. It will be further appreciated that the amount of surface modified abrasive particles in the organic bond composite formed according to embodiments described herein may be within a range between any of the minimum and maximum values noted above.

According to particular embodiments, the organic bond composite formed according to embodiments described herein may have a particular flexure strength improvement ratio $OCFS_{SMP}/OCFS_{UCP}$, where $OCFS_{SMP}$ is the flexure strength of the organic bond composite and $OCFS_{UCP}$ is the flexure strength of a reference composite having the same composition as the organic bond composite but being formed using non-surface modified abrasive particles. For example, the organic bond composite may have a flexure strength improvement ratio $OCFS_{SMP}/OCFS_{UCP}$ or at least about 1.2 or at least about 1.3 or at least about 1.4 or at least about 1.5 or at least about 1.6 or at least about 1.7 or at least about 1.8 or at least about 1.9 or at least about 2.0. It will be appreciated that the organic bond composite may have a flexure strength improvement ratio $OCFS_{SMP}/OCFS_{UCP}$ of any value between any of the values noted above. It will be further appreciated the organic bond composite may have a flexure strength improvement ratio $OCFS_{SMP}/OCFS_{UCP}$ within a range between any of the values noted above. For purposes of embodiments described herein, flexure strength is measure according to modified ASTM D2344/D2344M-00.

Figure 3:
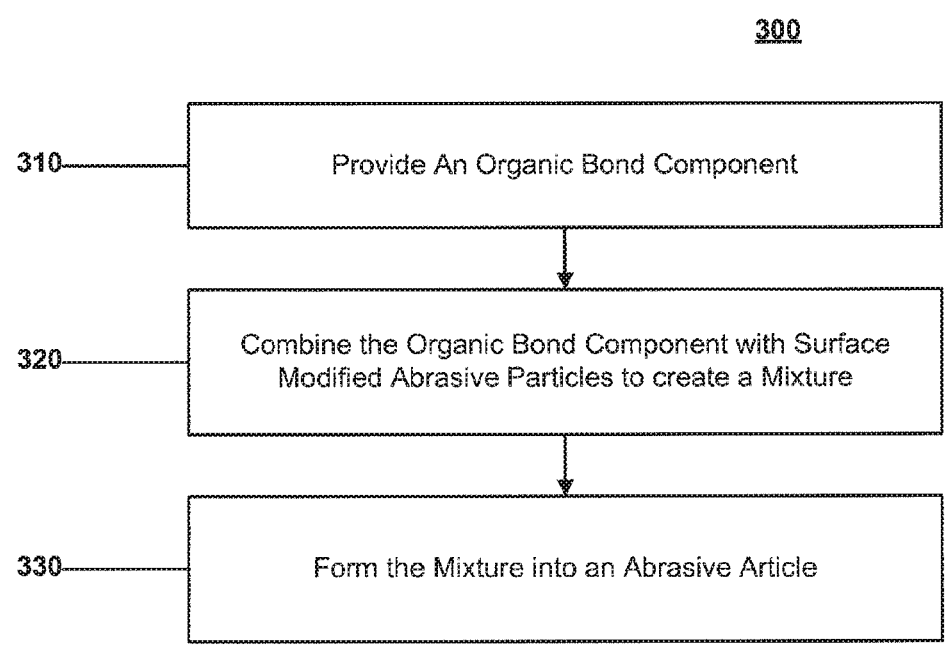
FIG. 3 includes an illustration of a flow diagram of a process for forming an abrasive article that includes surface modified abrasive particles according to embodiments described herein.

Referring now to methods of forming an abrasive article including surface modified abrasive particles, FIG. 3 illustrates an abrasive article forming process 300. Abrasive article forming process 300 may include a first step 310 of providing at least one unprocessed organic bond component, a second step 320 of combining the unprocessed organic bond component with surface modified abrasive particles to create a abrasive article forming mixture and a third step 230 of forming the abrasive article forming mixture into an abrasive article.

Referring to first step 310, according to certain embodiments, the unprocessed organic bond component may include particular organic materials. For example, the unprocessed organic bond component may include any organic component suitable for provide structural strength during formation of the abrasive article. According to particular embodiments, the unprocessed organic bond component may include any organic material. For example, the organic material can be a material such as a thermoset, thermoplastic, adhesive and a combination thereof. According to still other embodiments, the organic material of the unprocessed organic bond component may include a material such as polyimides, polyamides, resins, aramids, epoxies, polyesters, polyurethanes, acetates, celluloses, and a combination thereof. In still other embodiments, the unprocessed bond component may include a binder material utilizing a combination of a thermoplastic material configured to cure at a particular temperature. In still other embodiments, the unprocessed bond component may include an adhesive material suitable for facilitating attachment between other components of the mixture, for example, the surface modified abrasive particles. According to particular embodiments, the unprocessed bond component may be in the form of a liquid, including for example, an aqueous-based or non-aqueous-based compound.

According to certain embodiments, the unprocessed organic bond component may be present in a relative minor amount (by weight) within the abrasive article forming mixture. For example, the unprocessed organic bond component may be present in amount less than the amount of the surface modified abrasive grains. For example, the abrasive article forming mixture may include not greater than about 50 wt. % unprocessed organic bond component for a total weight of the abrasive article forming mixture or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. % or not greater than about 28 wt. % or not greater than about 25 wt. %. According to still other embodiments, the abrasive article forming mixture may include at least about 5 wt. % unprocessed organic bond component for a total weigh of the abrasive article forming mixture or at least about 7 wt. % or at least about 10 wt. % or at least about 12 wt. % or at least about 15 wt. % or at least about 17 wt. % or at least about 20 wt. % or at least about 22 wt. %. It will be appreciated that the amount of unprocessed organic bond component in the abrasive article forming mixture may be any value between any of minimum and maximum values noted above. It will be further appreciated that the amount of unprocessed organic bond component in the abrasive article forming mixture may be within a range between any of the minimum and maximum values noted above.

Referring to second step 320, according to particular embodiments, the surface modified abrasive particles may be formed according to any embodiments described herein and may include a core abrasive particle functionally connected to a coating material. It will be further appreciated that the surface modified abrasive particle combined with the unprocessed organic bond component may include any components or characteristics described herein with reference to a surface modified abrasive particle.

According to certain embodiments, the surface modified abrasive particles may be present in a particular amount within the abrasive article forming mixture. For example, the abrasive article forming mixture may include not greater than about 90 wt. % surface modified abrasive particles for a total weight of the abrasive article forming mixture or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or not greater than about 70 wt. % or not greater than about 68 wt. % or not greater than about 65 wt. %. According to still other embodiments, the abrasive article forming mixture may include at least about 55 wt. % surface modified abrasive particles for a total weigh of the abrasive article forming mixture or at least about 57 wt. % or at least about 60 wt. % or at least about 62 wt. % or at least about 65 wt. % or at least about 67 wt. % or at least about 70 wt. % or at least about 72 wt. %. It will be appreciated that the amount of surface modified abrasive particles in the abrasive article forming mixture may be any value between any of minimum and maximum values noted above. It will be further appreciated that the amount of surface modified abrasive particles in the abrasive article forming mixture may be within a range between any of the minimum and maximum values noted above.

Referring to third step 330, forming the mixture into an abrasive article may include any method of curing or sintering the unprocessed organic bond to solidify it within the composite.

Referring now to the abrasive article formed according to embodiments described herein, the abrasive article may include at least one organic bond component and a surface modified abrasive particle within the organic bond component.

According to certain embodiments, the organic bond component of the abrasive article formed according to embodiments described herein may include particular organic materials. For example, the organic bond component may include any organic component suitable for provide structural strength to the abrasive article formed according to embodiments described herein. According to particular embodiments, the organic bond component may include any organic material. For example, the organic material can be a material such as a thermoset, thermoplastic, adhesive and a combination thereof. According to still other embodiments, the organic material of the organic bond component may include a material such as polyimides, polyamides, resins, aramids, epoxies, polyesters, polyurethanes, acetates, celluloses, and a combination thereof. In still other embodiments, the bond component may include a binder material utilizing a combination of a thermoplastic material configured to cure at a particular temperature. In still other embodiments, the bond component may include an adhesive material suitable for facilitating attachment between other components of the mixture, for example, the surface modified abrasive particles.

According to certain embodiments, the organic bond component may be present in a relative minor amount (by weight) of the abrasive article formed according to embodiments described herein. For example, the organic bond component may be present in amount less than the amount of the surface modified abrasive grains. For example, the abrasive article formed according to embodiments described herein may include not greater than about 50 wt. % organic bond component for a total weight of the abrasive article or not greater than about 48 wt. % or not greater than about 45 wt. % or not greater than about 43 wt. % or not greater than about 40 wt. % or not greater than about 38 wt. % or not greater than about 35 wt. % or not greater than about 33 wt. % or not greater than about 30 wt. % or not greater than about 28 wt. % or not greater than about 25 wt. %. According to still other embodiments, the abrasive article formed according to embodiments described herein may include at least about 5 wt. % organic bond component for a total weigh of the organic bond component or at least about 7 wt. % or at least about 10 wt. % or at least about 12 wt. % or at least about 15 wt. % or at least about 17 wt. % or at least about 20 wt. % or at least about 22 wt. %. It will be appreciated that the amount of organic bond component in the abrasive article may be any value between any of minimum and maximum values noted above. It will be further appreciated that the amount of organic bond component in the abrasive article may be within a range between any of the minimum and maximum values noted above.

According to particular embodiments, the surface modified abrasive particles may be formed according to any embodiments described herein and may include a core abrasive particle functionally connected to a coating material. It will be appreciated that the surface modified abrasive particle combined with the organic bond component may further include any components or characteristics described herein with reference to a surface modified abrasive particle.

According to certain embodiments, the surface modified abrasive particles may be present in a particular amount of the abrasive article formed according to embodiments described herein. For example, the of the abrasive article formed according to embodiments described herein may include not greater than about 90 wt. % surface modified abrasive particles for a total weight of the abrasive article or not greater than about 88 wt. % or not greater than about 85 wt. % or not greater than about 83 wt. % or not greater than about 80 wt. % or not greater than about 78 wt. % or not greater than about 75 wt. % or not greater than about 73 wt. % or not greater than about 70 wt. % or not greater than about 68 wt. % or not greater than about 65 wt. %. According to still other embodiments, the abrasive article formed according to embodiments described herein may include at least about 55 wt. % surface modified abrasive particles for a total weigh of the abrasive article or at least about 57 wt. % or at least about 60 wt. % or at least about 62 wt. % or at least about 65 wt. % or at least about 67 wt. % or at least about 70 wt. % or at least about 72 wt. %. It will be appreciated that the amount of surface modified abrasive particles in the abrasive article formed according to embodiments described herein may be any value between any of minimum and maximum values noted above. It will be further appreciated that the amount of surface modified abrasive particles in the abrasive article formed according to embodiments described herein may be within a range between any of the minimum and maximum values noted above.

According to particular embodiments, the abrasive article formed according to embodiments described herein may have a particular flexure strength improvement ratio $AAFS_{SMP}/AAFS_{UCP}$, where $AAFS_{SMP}$ is the flexure strength of the abrasive article and $AAFS_{UCP}$ is the flexure strength of a reference composite having the same composition as the abrasive article but being formed using non-surface modified abrasive particles. For example, the abrasive article may have a flexure strength improvement ratio $AAFS_{SMP}/AAFS_{UCP}$ of at least about 1.3 or at least about 1.4 or at least about 1.5 or at least about 1.6 or at least about 1.7 or at least about 1.8 or at least about 1.9 or at least about 2.0. It will be appreciated that the abrasive article may have a flexure strength improvement ratio $AAFS_{SMP}/AAFS_{UCP}$ of any value between any of the values noted above. It will be further appreciated the abrasive article may have a flexure strength improvement ratio $AAFS_{SMP}/AAFS_{UCP}$ within a range between any of the values noted above. For purposes of embodiments described herein, flexure strength is measure according to modified ASTM D2344/D2344M-00.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A surface modified abrasive particle comprising: a core abrasive particle having a median particle size of at least about 0.06 microns; and a coating material functionally connected to a surface of the core abrasive particle, wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

Embodiment 2. An organic bond composite comprising: an organic bond component; and a surface modified abrasive particle dispersed within the organic bond component, wherein the surface modified abrasive particle comprises: a core abrasive particle having a median particle size of at least about 0.06 microns; and a coating material functionally connected to a surface of the core abrasive particle, wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

Embodiment 3. A method of forming an organic bond composite, wherein the method comprises: providing an organic bond component; providing a surface modified abrasive particle, and combining the organic bond component with the surface modified abrasive particle to form the organic bond composite, wherein the surface modified abrasive particle comprises: a core abrasive particle having a median particle size of at least about 0.06 microns; and a coating material functionally connected to a surface of the core abrasive particle, wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

Embodiment 4. An abrasive article comprising: an organic bond component; and abrasive particles within the organic bond component, wherein at least one of the abrasive particles is a surface modified particle, and wherein the surface modified abrasive particle comprises: a core abrasive particle having a median particle size of at least about 0.06 microns; and a coating material functionally connected to a surface of the core abrasive particle, wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

Embodiment 5. A method of forming an abrasive article, wherein the method comprises: providing an organic bond component; providing abrasive particles; combining the organic bond component with the abrasive particles to for a green body; and forming the green body into the abrasive article, wherein at least one of the abrasive particles is a surface modified particle, and wherein the surface modified abrasive particle comprises: a core abrasive particle having a median particle size of at least about 0.06 microns; and a coating material functionally connected to a surface of the core abrasive particle, wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

Embodiment 6. The surface modified abrasive particle, organic bond composite, abrasive article or method of any one of embodiments 1, 2, 3, 4, and 5, wherein the core abrasive particle comprises alumina, zirconia, oxides, carbides, nitrides, borides, diamond, superabrasives, white alundum, brown alundum, microcrystalline alumina abrasive, fusedany alumina zirconia, silicon carbide, boron carbide, boron nitride, silica or combinations thereof.

Embodiment 7. The surface modified abrasive particle, organic bond composite, abrasive article or method of any one of embodiments 1, 2, 3, 4, and 5, wherein the core abrasive particle comprises alumina and zirconia.

Embodiment 8. The surface modified abrasive particle, organic bond composite, abrasive article or method of any one of embodiments 1, 2, 3, 4, and 5, wherein the core abrasive particle consists essentially of alumina and zirconia.

Embodiment 9. The surface modified abrasive particle, organic bond composite, abrasive article or method of any one of embodiments 1, 2, 3, 4, and 5, wherein the core abrasive particle comprises not greater than 99 wt. % alumina for the total weight of the core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %.

Embodiment 10. The surface modified abrasive particle, organic bond composite, abrasive article or method of any one of embodiments 1, 2, 3, 4, and 5, wherein the core abrasive particle comprises at least 1 wt. % alumina for a total weight of the core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. %.

Embodiment 11. The surface modified abrasive particle, organic bond composite, abrasive article or method of any one of embodiments 1, 2, 3, 4, and 5, wherein the core abrasive particle comprises not greater than 99 wt. % zirconia for a total weight of the core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %.

Embodiment 12. The surface modified abrasive particle, organic bond composite, abrasive article or method of any one of embodiments 1, 2, 3, 4, and 5, wherein the core abrasive particle comprises at least 1 wt. % zirconia for a total weight of the core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 99 wt. %.

Embodiment 13. The surface modified abrasive particle, organic bond composite, abrasive article or method of any one of embodiments 1, 2, 3, 4, and 5, wherein the core abrasive particle is substantially free of nitrides, borides, or any combination thereof.

Embodiment 14. The surface modified abrasive particle, organic bond composite, abrasive article or method of any one of embodiments 1, 2, 3, 4, and 5, wherein the core abrasive particle is substantially free of metals, metal alloys, any combination thereof.

Embodiment 15. The surface modified abrasive particle, organic bond composite, abrasive article or method of any one of embodiments 1, 2, 3, 4, and 5, wherein the core abrasive particle comprises a median particle size (D50) of not greater than 40000 microns or not greater than 30000 microns or not greater than 20000 microns or not greater than 10000 microns or not greater than 5000 microns or not greater than 4000 microns or not greater than 3000 microns or not greater than 2000 microns or not greater than 1000 microns or not greater than 500 microns or not greater than 200 microns or not greater than 100 microns or not greater than 80 microns or not greater than 50 microns or not greater than 20 microns or not greater than 10 microns.

Embodiment 16. The surface modified abrasive particle, organic bond composite, abrasive article or method of any one of embodiments 1, 2, 3, 4, and 5, wherein the core abrasive particle comprises a median particle size (D50) of at least 1 micron or at least 5 microns or at least 10 microns or at least 20 microns or at least 50 microns or at least 80 microns or at least 100 microns or at least 200 microns or at least 500 microns or at least 1000 microns or at least 2000 microns or at least 3000 microns or at least 4000 microns or at least 5000 microns or at least 10000 microns or at least 20000 microns or at least 30000 microns.

Embodiment 17. The surface modified abrasive particle, organic bond composite, abrasive article or method of any one of embodiments 1, 2, 3, 4, and 5, wherein the coating material is covalently bonded to the surface of the core abrasive particle.

Embodiment 18. The surface modified abrasive particle, organic bond composite, abrasive article or method of any one of embodiments 1, 2, 3, 4, and 5, wherein the coating material is functionally connected to the surface of the core abrasive particle through hydrogen bonding.

Embodiment 19. The surface modified abrasive particle, organic bond composite, abrasive article or method of any one of embodiments 1, 2, 3, 4, and 5, wherein the coating material is functionally connected to the surface of the core abrasive particle through complexing of at least one catechol group of the coating material and metal ions of the core abrasive particle.

Embodiment 20. The surface modified abrasive particle, organic bond composite, abrasive article or method of any one of embodiments 1, 2, 3, 4, and 5, wherein the coating material is a dopamine coating material.

Embodiment 21. The surface modified abrasive particle, organic bond composite, abrasive article or method of any one of embodiments 1, 2, 3, 4, and 5, wherein a majority of the coating material is covalently bonded to the core abrasive particle via an oxygen linkage.

Embodiment 22. The surface modified abrasive particle, organic bond composite, abrasive article or method of any one of embodiments 1, 2, 3, 4, and 5, wherein a majority of the coating material is covalently bonded to the core abrasive particle via an NH linkage.

Embodiment 23. The surface modified abrasive particle, organic bond composite, abrasive article or method of any one of embodiments 1, 2, 3, 4, and 5, wherein at least about 95% of the coating material is covalently bonded to the core abrasive particle via an NH linkage, wherein at least about 95% of the coating material is covalently bonded to the core abrasive particle via an oxygen linkage.

Embodiment 24. The surface modified abrasive particle, organic bond composite, abrasive article or method of any one of embodiments 1, 2, 3, 4, and 5, wherein the coating material covers not greater than 99% of an outer surface of the core abrasive particle or not greater than 98% or not greater than 97% or not greater than 96% or not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10%.

Embodiment 25. The surface modified abrasive particle, organic bond composite, abrasive article or method of any one of embodiments 1, 2, 3, 4, and 5, wherein the coating material covers at least 1% of an outer surface of the core abrasive particle or at least 2% or at least 3% or at least 4% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% or at least 96% or at least 97% or at least 98% or at least 99%.

Embodiment 26. The surface modified abrasive particle, organic bond composite, abrasive article or method of any one of embodiments 1, 2, 3, 4, and 5, wherein the coating material covers a majority of an outer surface of the core abrasive particle.

Embodiment 27. The surface modified abrasive particle, organic bond composite, abrasive article or method of any one of embodiments 1, 2, 3, 4, and 5, wherein the coating material is present in an amount of not greater than 10 wt. % of the total weight of the particle including the core abrasive particle and the coating material or not greater than 9 wt. % or not greater than 8 wt. % or not greater than 7 wt. % or not greater than 6 wt. % or not greater than 5 wt. % or not greater than 4 wt. % or not greater than 3 wt. % or not greater than 2 wt. % or not greater than 1.5 wt. % or not greater than 1 wt. %.

Embodiment 28. The surface modified abrasive particle, organic bond composite, abrasive article or method of any one of embodiments 1, 2, 3, 4, and 5, wherein the coating material is present in an amount of at least 0.05 wt. % of the weight of the particle including the core abrasive particle and the coating material or at least 0.06 wt. % or at least 0.07 wt. % or at least 0.08 wt. % or at least 0.09 wt. % or at least 0.1 wt. % or at least 0.5 wt. % or at least 1 wt. % or at least 1.5 wt. % or at least 2 wt. % or at least 2.5 wt. % or at least 3 wt. % or at least 4 wt. % or at least 5 wt. % or at least 6 wt. % or at least 7 wt. % or at least 8 wt. % or at least 9 wt. %.

Embodiment 29. The organic bond composite, abrasive article or method of any one of embodiments 2, 3, 4, and 5, wherein the organic bond material comprises a thermoset, thermoplastic, adhesive, a polyimides, polyamides, resins, aramids, epoxies, polyesters, polyurethanes, acetates, celluloses, and combinations thereof.

Embodiment 30. The organic bond composite or method of any one of embodiments 2 and 3, wherein the organic bond composite comprises a flexure strength improvement ratio $OCFS_{SMP}/OCFS_{UCP}$ of at least about or at least 1.2, where $OCFS_{SMP}$ is the flexure strength of the organic bond composite and $OCFS_{UCP}$ is the flexure strength of a reference composite having the same composition as the organic bond composite but being formed using non-surface modified abrasive particles, or at least about 1.3 or at least about 1.4 or at least about 1.5 or at least about 1.6 or at least about 1.7 or at least about 1.8 or at least about 1.9 or at least about 2.0.

Embodiment 31. The abrasive article or method of any one of embodiments 4 and 5, wherein the abrasive article comprises a flexure strength improvement ratio $AAFS_{SMP}/AAFS_{UCP}$ of at least about 1.3, where $AAFS_{SMP}$ is the flexure strength of the abrasive article and $AAFS_{UCP}$ is the flexure strength of a reference article having the same composition as the abrasive article but being formed using non-surface modified abrasive particles, or at least about 1.4 or at least about 1.5 or at least about 1.6 or at least about 1.7 or at least about 1.8 or at least about 1.9 or at least about 2.0.

Embodiment 32. The method of any one of embodiments 3 and 5, wherein providing a surface modified abrasive particle comprises: providing a core abrasive particle; and treating the surface of the core abrasive particle with a solution comprising a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

Embodiment 33. The method of embodiment 32, wherein treating the surface of the core abrasive particle with a solution comprising dopamine further comprises preparing polymerizing dopamine to form polydopamine.

Embodiment 34. The method of embodiment 32, wherein treating the surface of the core abrasive particle with a solution comprises submerging the core abrasive particle in the solution.

Embodiment 35. The method of embodiment 34, wherein the core abrasive particle is submerged in the solution for at least about 2 hours.

Embodiment 36. The method of embodiment 32, wherein the solution comprises a dopamine concentration of at least about 0.05 g/L and not greater than about 50.0 g/L.

Embodiment 37. The method of embodiment 32, wherein the method further comprises filtering the surface modified abrasive particle.

Embodiment 38. The method of embodiment 32, wherein the method further comprises washing the surface modified abrasive particle.

Embodiment 39. The method of embodiment 32, wherein the method further comprises drying the surface modified abrasive particle.

Embodiment 40. The method of embodiment 39, wherein drying the surface modified abrasive particle comprises heating the surface modified abrasive particle at a temperature of at least about 50° C.

Embodiment 41. The method of embodiment 39, wherein drying the surface modified abrasive particle comprises heating the surface modified abrasive particle for at least about 8 hours.

Embodiment 42. A surface modified abrasive particle comprising: a core abrasive particle having a median particle size of at least about 0.06 microns; and a dopamine coating material functionally connected to a surface of the core abrasive particle.

Embodiment 43. An organic bond composite comprising: an organic bond component; and a surface modified abrasive particle dispersed within the organic bond component, wherein the surface modified abrasive particle comprises: a core abrasive particle having a median particle size of at least about 0.06 microns; and a dopamine coating material functionally connected to a surface of the core abrasive particle.

Embodiment 44. A method of forming an organic bond composite, wherein the method comprises: providing an organic bond component; providing a surface modified abrasive particle, combining the organic bond component with the surface modified abrasive particle to form the organic bond composite, wherein the surface modified abrasive particle comprises: a core abrasive particle having a median particle size of at least about 0.06 microns; and a dopamine coating material functionally connected to a surface of the core abrasive particle.

Embodiment 45. An abrasive article comprising: an organic bond component; and abrasive particles within the organic bond component, wherein at least one of the abrasive particles is a surface modified particle, and wherein the surface modified abrasive particle comprises: a core abrasive particle having a median particle size of at least about 0.06 microns; and a dopamine coating material functionally connected to a surface of the core abrasive particle.

Embodiment 46. A method of forming an abrasive article, wherein the method comprises: providing an organic bond component; providing abrasive particles; combining the organic bond component with the abrasive particles to for a green body; and forming the green body into the abrasive article, wherein at least one of the abrasive particles is a surface modified particle, and wherein the surface modified abrasive particle comprises: a core abrasive particle having a median particle size of at least about 0.06 microns; and a dopamine coating material functionally connected to a surface of the core abrasive particle.

Embodiment 47. The surface modified abrasive particle, organic bond composite, abrasive article or method of any one of embodiments 42, 43, 44, 45, and 46, wherein the core abrasive particle comprises alumina, zirconia, oxides, carbides, nitrides, borides, diamond, superabrasives, white alundum, brown alundum, microcrystalline alumina abrasive, fused alumina zirconia, silicon carbide, boron carbide, boron nitride, silica.

Embodiment 48. The surface modified abrasive particle, organic bond composite, abrasive article or method of any one of embodiments 42, 43, 44, 45, and 46, wherein the core abrasive particle comprises alumina and zirconia.

Embodiment 49. The surface modified abrasive particle, organic bond composite, abrasive article or method of any one of embodiments 42, 43, 44, 45, and 46, wherein the core abrasive particle consists essentially of alumina and zirconia.

Embodiment 50. The surface modified abrasive particle, organic bond composite, abrasive article or method of any one of embodiments 42, 43, 44, 45, and 46, wherein the core abrasive particle comprises not greater than 99 wt. % alumina for the total weight of the core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %.

Embodiment 51. The surface modified abrasive particle, organic bond composite, abrasive article or method of any one of embodiments 42, 43, 44, 45, and 46, wherein the core abrasive particle comprises least 1 wt. % alumina for a total weight of the core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. %.

Embodiment 52. The surface modified abrasive particle, organic bond composite, abrasive article or method of any one of embodiments 42, 43, 44, 45, and 46, wherein the core abrasive particle comprises not greater than 99 wt. % zirconia for a total weight of the core abrasive particle or not greater than 95 wt. % or not greater than 90 wt. % or not greater than 85 wt. % or not greater than 80 wt. % or not greater than 75 wt. % or not greater than 70 wt. % or not greater than 65 wt. % or not greater than 60 wt. % or not greater than 55 wt. % or not greater than 50 wt. % or not greater than 45 wt. % or not greater than 40 wt. % or not greater than 35 wt. % or not greater than 30 wt. % or not greater than 25 wt. % or not greater than 20 wt. % or not greater than 15 wt. % or not greater than 10 wt. % or not greater than 5 wt. %.

Embodiment 53. The surface modified abrasive particle, organic bond composite, abrasive article or method of any one of embodiments 42, 43, 44, 45, and 46, wherein the core abrasive particle comprises at least 1 wt. % zirconia for a total weight of the core abrasive particle or at least 5 wt. % or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 99 wt. %.

Embodiment 54. The surface modified abrasive particle, organic bond composite, abrasive article or method of any one of embodiments 42, 43, 44, 45, and 46, wherein the core abrasive particle is substantially free of nitrides, borides, or any combination thereof.

Embodiment 55. The surface modified abrasive particle, organic bond composite, abrasive article or method of any one of embodiments 42, 43, 44, 45, and 46, wherein the core abrasive particle is substantially free of metals, metal alloys, any combination thereof.

Embodiment 56. The surface modified abrasive particle, organic bond composite, abrasive article or method of any one of embodiments 42, 43, 44, 45, and 46, wherein the core abrasive particle comprises a median particle size (D50) of not greater than 40000 microns or not greater than 30000 microns or not greater than 20000 microns or not greater than 10000 microns or not greater than 5000 microns or not greater than 4000 microns or not greater than 3000 microns or not greater than 2000 microns or not greater than 1000 microns or not greater than 500 microns or not greater than 200 microns or not greater than 100 microns or not greater than 80 microns or not greater than 50 microns or not greater than 20 microns or not greater than 10 microns.

Embodiment 57. The surface modified abrasive particle, organic bond composite, abrasive article or method of any one of embodiments 42, 43, 44, 45, and 46, wherein the core abrasive particle comprises a median particle size (D50) of at least 1 micron or at least 5 microns or at least 10 microns or at least 20 microns or at least 50 microns or at least 80 microns or at least 100 microns or at least 200 microns or at least 500 microns or at least 1000 microns or at least 2000 microns or at least 3000 microns or at least 4000 microns or at least 5000 microns or at least 10000 microns or at least 20000 microns or at least 30000 microns.

Embodiment 58. The surface modified abrasive particle, organic bond composite, abrasive article or method of any one of embodiments 42, 43, 44, 45, and 46, wherein the dopamine coating material is covalently bonded to the surface of the core abrasive particle.

Embodiment 59. The surface modified abrasive particle, organic bond composite, abrasive article or method of any one of embodiments 42, 43, 44, 45, and 46, wherein the dopamine coating material is functionally connected to the surface of the core abrasive particle through hydrogen bonding.

Embodiment 60. The surface modified abrasive particle, organic bond composite, abrasive article or method of any one of embodiments 42, 43, 44, 45, and 46, wherein the dopamine coating material is functionally connected to the surface of the core abrasive particle through complexing of at least one catechol group of the coating material and metal ions of the core abrasive particle.

Embodiment 61. The surface modified abrasive particle, organic bond composite, abrasive article or method of embodiments 42, 43, 44, 45, and 46, wherein a majority of the dopamine coating material is covalently bonded to the core abrasive particle via an oxygen linkage.

Embodiment 62. The surface modified abrasive particle, organic bond composite, abrasive article or method of embodiments 42, 43, 44, 45, and 46, wherein a majority of the dopamine coating material is covalently bonded to the core abrasive particle via an NH linkage.

Embodiment 63. The surface modified abrasive particle, organic bond composite, abrasive article or method of any one of embodiments 42, 43, 44, 45, and 46, wherein at least about 95% of the coating material is covalently bonded to the core abrasive particle via an NH linkage, wherein at least about 95% of the coating material is covalently bonded to the core abrasive particle via an oxygen linkage.

Embodiment 64. The surface modified abrasive particle, organic bond composite, abrasive article or method of any one of embodiments 42, 43, 44, 45, and 46, wherein the dopamine coating material covers not greater than 99% of an outer surface of the core abrasive particle or not greater than 98% or not greater than 97% or not greater than 96% or not greater than 95% or not greater than 90% or not greater than 85% or not greater than 80% or not greater than 75% or not greater than 70% or not greater than 65% or not greater than 60% or not greater than 55% or not greater than 50% or not greater than 45% or not greater than 40% or not greater than 35% or not greater than 30% or not greater than 25% or not greater than 20% or not greater than 15% or not greater than 10%.

Embodiment 65. The surface modified abrasive particle, organic bond composite, abrasive article or method of any one of embodiments 42, 43, 44, 45, and 46, wherein the dopamine coating material covers at least 1% of an outer surface of the core abrasive particle or at least 2% or at least 3% or at least 4% or at least 5% or at least 10% or at least 15% or at least 20% or at least 25% or at least 30% or at least 35% or at least 40% or at least 45% or at least 50% or at least 55% or at least 60% or at least 65% or at least 70% or at least 75% or at least 80% or at least 85% or at least 90% or at least 95% or at least 96% or at least 97% or at least 98% or at least 99%.

Embodiment 66. The surface modified abrasive particle, organic bond composite, abrasive article or method of any one of embodiments 42, 43, 44, 45, and 46, wherein the dopamine coating material covers a majority of an outer surface of the core abrasive particle.

Embodiment 67. The surface modified abrasive particle, organic bond composite, abrasive article or method of any one of embodiments 42, 43, 44, 45, and 46, wherein the dopamine coating material is present in an amount of not greater than 10 wt. % of the total weight of the particle including the core abrasive particle and the coating material or not greater than 9 wt. % or not greater than 8 wt. % or not greater than 7 wt. % or not greater than 6 wt. % or not greater than 5 wt. % or not greater than 4 wt. % or not greater than 3 wt. % or not greater than 2 wt. % or not greater than 1.5 wt. % or not greater than 1 wt. %.

Embodiment 68. The surface modified abrasive particle, organic bond composite, abrasive article or method of any one of embodiments 42, 43, 44, 45, and 46, wherein the dopamine coating material is present in an amount of at least 0.05 wt. % of the weight of the particle including the core abrasive particle and the coating material or at least 0.06 wt. % or at least 0.07 wt. % or at least 0.08 wt. % or at least 0.09 wt. % or at least 0.1 wt. % or at least 0.5 wt. % or at least 1 wt. % or at least 1.5 wt. % or at least 2 wt. % or at least 2.5 wt. % or at least 3 wt. % or at least 4 wt. % or at least 5 wt. % or at least 6 wt. % or at least 7 wt. % or at least 8 wt. % or at least 9 wt. %.

Embodiment 69. The organic bond composite, abrasive article or method of any one of embodiments 43, 44, 45, and 46, wherein the organic bond material comprises a thermoset, thermoplastic, adhesive, a polyimides, polyamides, resins, aramids, epoxies, polyesters, polyurethanes, acetates, celluloses, and combinations thereof.

Embodiment 70. The organic bond composite or method of any one of embodiments 43 and 44, wherein the organic bond composite comprises a flexure strength improvement ratio $OCFS_{SMP}/OCFS_{UCP}$ of at least about 1.2, where $OCFS_{SMP}$ is the flexure strength of the organic bond composite and $OCFS_{UCP}$ is the flexure strength of a reference composite having the same composition as the organic bond composite but being formed using non-surface modified abrasive particles, or at least about 1.3 or at least about 1.4 or at least about 1.5 or at least about 1.6 or at least about 1.7 or at least about 1.8 or at least about 1.9 or at least about 2.0.

Embodiment 71. The abrasive article or method of any one of embodiments 45 and 46, wherein the abrasive article comprises a flexure strength improvement ratio $AAFS_{SMP}/AAFS_{UCP}$ of at least about 1.3, where $AAFS_{SMP}$ is the flexure strength of the abrasive article and $AAFS_{UCP}$ is the flexure strength of a reference article having the same composition as the abrasive article but being formed using non-surface modified abrasive particles, or at least about 1.4 or at least about 1.5 or at least about 1.6 or at least about 1.7 or at least about 1.8 or at least about 1.9 or at least about 2.0.

Embodiment 72. The method of any one of embodiments 44 and 46, wherein providing a surface modified abrasive particle comprises: providing a core abrasive particle; and treating the surface of the core abrasive particle with a solution comprising dopamine.

Embodiment 73. The method of embodiment 72, wherein treating the surface of the core abrasive particle with a solution comprising dopamine comprises preparing polymerizing dopamine to form polydopamine.

Embodiment 74. The method of embodiment 72, wherein treating the surface of the core abrasive particle with a solution comprises submerging the core abrasive particle in the solution.

Embodiment 75. The method of embodiment 74, wherein the core abrasive particle is submerged in the solution for at least about 2 hours.

Embodiment 76. The method of embodiment 72, wherein the solution comprises a dopamine concentration of at least about 0.05 g/L and not greater than about 50.0 g/L.

Embodiment 77. The method of embodiment 72, wherein the method further comprises filtering the surface modified abrasive particle.

Embodiment 78. The method of embodiment 72, wherein the method further comprises washing the surface modified abrasive particle.

Embodiment 79. The method of embodiment 72, wherein the method further comprises drying the surface modified abrasive particle.

Embodiment 80. The method of embodiment 79, wherein drying the surface modified abrasive particle comprises heating the surface modified abrasive particle at a temperature of at least about 50° C.

Embodiment 81. The method of embodiment 79, wherein drying the surface modified abrasive particle comprises heating the surface modified abrasive particle for at least about 8 hours.

EXAMPLES

Example 1

Sample abrasive articles S1-S5 were formed according to embodiments described herein. Specifically, sample abrasive articles S1-S5 each include surface modified abrasive particles within an organic bond component. Each sample abrasive article S1-S5 was formed by mixing surface modified monocrystalline alumina abrasive particles (i.e., MA88K monocrystalline alumina abrasive particles) in a phenolic resin precursor mixture followed by pressing the mixture into 51.6 mm×12.6 mm×11.0 mm pieces and then curing them from room temperature to 200° C.

The surface modified abrasive particles included in each sample abrasive article S1-S5 were formed by immersing core abrasive particles in different dopamine coating solutions for 24 hours. Each respective dopamine coating solution was prepared by dissolving various amounts of dopamine coating material in Tris-HCL buffer solution. After soaking in the respective dopamine coating solutions for 24 hours, the surface modified abrasive particles were filtered, washed in deionized water and dried at 50° C. in a vacuum oven for 8 hours.

The respective dopamine coating solution concentrations used to form the surface modified abrasive particles for each sample abrasive article S 1-S5 are summarized in Table 1 below:

TABLE 1

Dopamine Concentration

| SAMPLE | Dopamine Solution Concentration (g/L) |
|---|---|
| S1 | 0.5 |
| S2 | 0.1 |
| S3 | 1.0 |
| S4 | 5.0 |
| S5 | 10.0 |

For purposes of comparison, a comparison sample abrasive article CS1 was formed. Comparison sample abrasive article CS1 was formed in the same way as sample abrasive articles S1-S5, except that comparison sample abrasive article CS1 was formed using untreated (i.e., non-surface modified) monocrystalline alumina abrasive particles (i.e., MA88K monocrystalline alumina abrasive particles) within the organic bond component. In other words, the abrasive particles of comparison sample abrasive article CS1 did not include a dopamine coating bonded to the surface of the abrasive particles.

Flexure strength of sample abrasive articles S1-S5 and comparison sample abrasive article CS1 was measured and recorded. Flexure strength was measured according to modified ASTM D2344/D2344M-00 under testing conditions summarized in Table 2 below:

TABLE 2

Flexure Strength Testing Conditions

| Dry condition: | Direct test within 24 h in the room (Temperature: about 25° C., Humidity: about 50%) |
|---|---|
| Apparatus: | Instron-5584 |
| Condition: | Load cell = 10 kN; Cross Head speed = 1.27 mm/m; Span area = 50.80 mm |
| Number of Measurements: | 6 pieces |

Flexure strength measurements were performed on six sample pieces of each sample abrasive articles S 1-S5 and comparison sample abrasive article CS1. The six measurements were then averaged and summarized in Table 3 below:

TABLE 3

Flexure Strength

| SAMPLE | Flexure Strength (MPa) | Std. Deviation (MPa) |
|---|---|---|
| CS1 | 24.14 | 1.73 |
| S1 | 44.12 | 3.20 |
| S2 | 48.31 | 2.58 |
| S3 | 44.71 | 3.62 |
| S4 | 41.03 | 2.62 |
| S5 | 37.77 | 2.21 |

Figure 4:
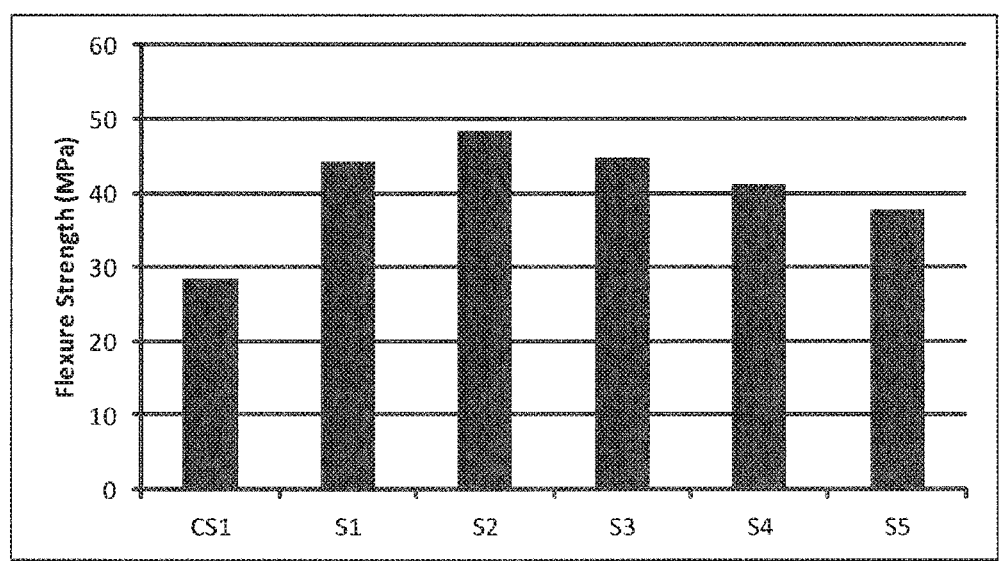
FIG. 4 includes a plot comparing the flexure strength of sample abrasive articles formed according to embodiments described herein with a comparison sample abrasive article.

FIG. 4 illustrates a plot of the flexure strength for each sample abrasive article S1-S5 and comparison abrasive article CS1.

Example 2

Sample abrasive articles S6-S8 were formed according to embodiments described herein. Specifically, sample abrasive articles S6-S8 each include surface modified abrasive particles within an organic bond component. Each sample abrasive article S6-S8 was formed by mixing surface modified monocrystalline alumina abrasive particles (i.e., MA88K monocrystalline alumina abrasive particles) in a phenolic resin precursor mixture followed by pressing the mixture into 51.6 mm×12.6 mm×11.0 mm pieces and then curing them from room temperature to 200° C.

The surface modified abrasive particles included in each sample abrasive article S6-S8 were formed by immersing abrasive grains in a dopamine coating solution for different amounts of time. The dopamine coating solution was prepared by dissolving dopamine coating material in Tris-HCL buffer solution. The concentration of dopamine coating material in the solution was 0.1 g/L. After soaking in the dopamine coating solution for the respective amounts of time, the surface modified abrasive particles were filtered, washed in deionized water and dried at 50° C. in a vacuum oven for 8 hours.

The respective immersion times used to form the surface modified abrasive particles for each sample abrasive article S6-S8 are summarized in Table 4 below:

TABLE 4

Dopamine Immersion Time

| SAMPLE | Time (hours) |
|---|---|
| S6 | 2 |
| S7 | 24 |
| S8 | 48 |

For purposes of comparison, a comparison sample abrasive article CS2 was formed. Comparison sample abrasive article CS2 included untreated (i.e., non-surface modified) monocrystalline alumina abrasive particles (i.e., MA88K monocrystalline alumina abrasive particles) within the organic bond component. In other words, the abrasive particles of comparison sample abrasive article CS2 did not include a dopamine coating bonded to the surface of the abrasive particles.

Flexure strength of sample abrasive articles S6-S8 and comparison sample abrasive article CS2 was measured and recorded. Flexure strength was measured according to modified ASTM D2344/D2344M-00 under testing conditions summarized in Table 3 above.

Flexure strength measurements were performed on six sample pieces of each sample abrasive articles S6-S8 and comparison sample abrasive article CS2. The six measurements were then average and summarized in Table 5 below:

TABLE 5

Flexure Strength

| SAMPLE | Flexure Strength (MPa) | Std. Deviation (MPa) |
|---|---|---|
| CS2 | 24.14 | 1.73 |
| S6 | 35.82 | 1.49 |
| S7 | 48.31 | 2.58 |
| S8 | 50.63 | 3.42 |

Figure 5:
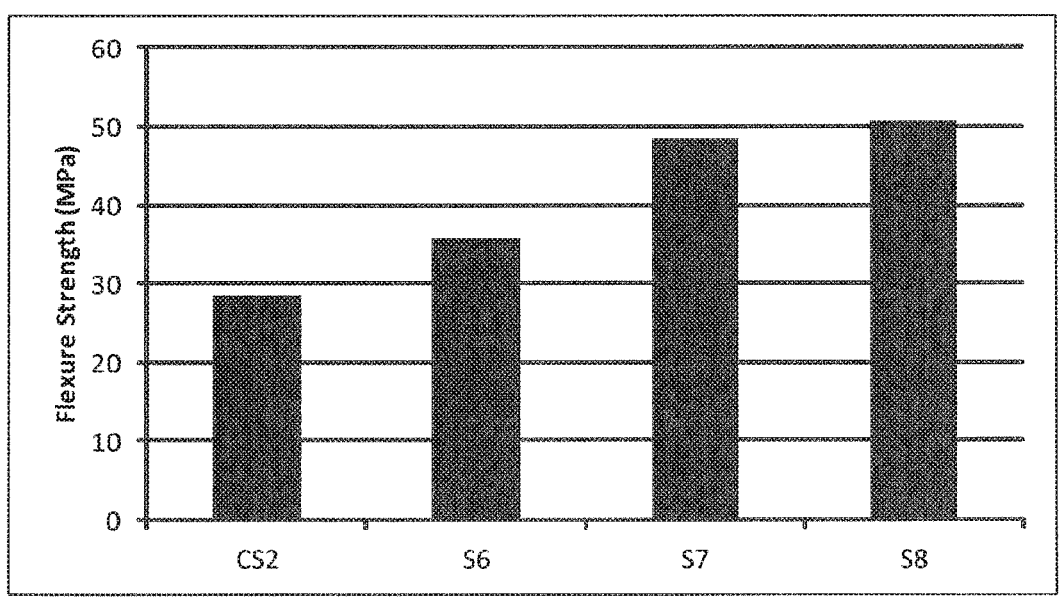
FIG. 5 includes a plot comparing the flexure strength of sample abrasive articles formed according to embodiments described herein with a comparison sample abrasive article.

FIG. 5 illustrates a plot of the flexure strength for each sample abrasive article S6-S8 and comparison abrasive article CS2.

Example 3

Sample abrasive articles S9-S11 were formed according to embodiments described herein. Specifically, sample abrasive articles S9-S11 each include surface modified abrasive particles within an organic bond component. Each sample abrasive article S9-S11 was formed by mixing surface modified monocrystalline alumina abrasive particles (i.e., MA88K monocrystalline alumina abrasive particles) in a phenolic resin precursor mixture followed by pressing the mixture into 51.6 mm×12.6 mm×11.0 mm pieces and then curing them from room temperature to 200° C.

The surface modified abrasive particles included in each sample abrasive article S9-S11 were formed by immersing core abrasive particles in different tannic acid coating solutions for 24 hours. Each respective tannic acid solution was prepared by dissolving various amounts of tannic acid coating material in Bis-tris-HCL buffer solution. After soaking in the respective tannic acid solutions for 24 hours, the surface modified abrasive particles were filtered, washed in deionized water and dried at 60° C. in a vacuum oven for 24 hours.

The respective tannic acid solution concentrations used to form the surface modified abrasive particles for each sample abrasive article S9-S11 are summarized in Table 6 below:

TABLE 6

Tannic Acid Concentration

| SAMPLE | Tannic Acid Solution Concentration (g/L) |
|---|---|
| S9 | 0.1 |
| S10 | 0.5 |
| S11 | 1.0 |

For purposes of comparison, a comparison sample abrasive article CS3 was formed. Comparison sample abrasive article CS3 was formed in the same way as sample abrasive articles S9-S11, except that comparison sample abrasive article CS3 was formed using untreated (i.e., non-surface modified) monocrystalline alumina abrasive particles (i.e., MA88K monocrystalline alumina abrasive particles) within the organic bond component. In other words, the abrasive particles of comparison sample abrasive article CS3 did not include a tannic acid coating bonded to the surface of the abrasive particles.

Flexure strength of sample abrasive articles S9-S11 and comparison sample abrasive article CS3 was measured and recorded. Flexure strength was measured according to modified ASTM D2344/D2344M-00 under testing conditions summarized in Table 7 below:

TABLE 7

Flexure Strength Testing Conditions

| | |
|---|---|
| Dry condition: | Direct test within 24 h in the room (Temperature: about 25° C., Humidity: about 50%) |
| Apparatus: | Instron-5584 |
| Condition: | Load cell = 10 kN; Cross Head speed = 1.27 mm/m; Span area = 50.80 mm |
| Number of Measurements: | 6 pieces |

Flexure strength measurements were performed on six sample pieces of each sample abrasive articles S9-S11 and comparison sample abrasive article CS3. The six measurements were then averaged and summarized in Table 8 below:

TABLE 8

Flexure Strength

| SAMPLE | Flexure Strength (MPa) | Std. Deviation (MPa) |
|---|---|---|
| CS3 | 41.31 | 2.31 |
| S9 | 51.76 | 2.44 |
| S10 | 46.56 | 2.38 |
| S11 | 49.92 | 2.08 |

Figure 6:
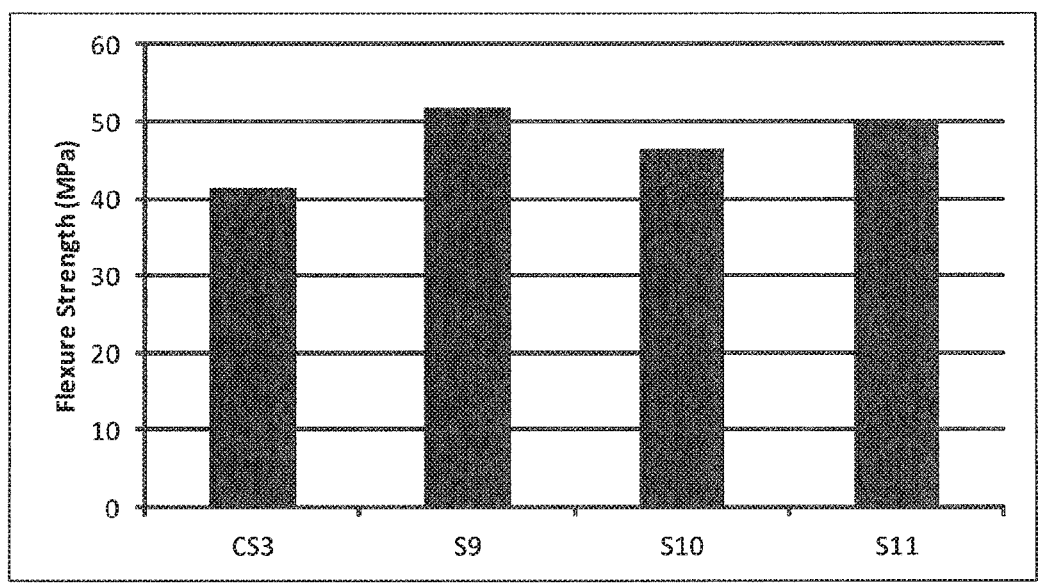
FIG. 6 includes a plot comparing the flexure strength of sample abrasive articles formed according to embodiments described herein with a comparison sample abrasive article.

FIG. 6 illustrates a plot of the flexure strength for each sample abrasive article S9-S11 and comparison abrasive article CS3.

Example 4

Sample abrasive articles S12-S14 were formed according to embodiments described herein. Specifically, sample abrasive articles S12-S14 each include surface modified abrasive particles within an organic bond component. Each sample abrasive article S12-S14 was formed by mixing surface modified AZ25 abrasive particles (i.e., abrasive particles having a composition of $Al_2O_3$ 75 wt %-$ZrO_2$ 25 wt %) in a phenolic resin precursor mixture followed by pressing the mixture into 51.6 mm×12.6 mm×11.0 mm pieces and then curing them from room temperature to 200° C.

The surface modified abrasive particles included in each sample abrasive article S9-S11 were formed by immersing core abrasive particles in different tannic acid coating solutions for 24 hours. Each respective tannic acid solution was prepared by dissolving various amounts of tannic acid coating material in Bis-tris-HCL buffer solution. After soaking in the respective tannic acid solutions for 24 hours, the surface modified abrasive particles were filtered, washed in deionized water and dried at 60° C. in a vacuum oven for 24 hours.

The respective tannic acid solution concentrations used to form the surface modified abrasive particles for each sample abrasive article S12-S14 are summarized in Table 9 below:

TABLE 9

Tannic Acid Concentration

| SAMPLE | Tannic Acid Solution Concentration (g/L) |
|---|---|
| S12 | 0.1 |
| S13 | 0.5 |
| S14 | 1.0 |

For purposes of comparison, a comparison sample abrasive article CS4 was formed. Comparison sample abrasive article CS4 was formed in the same way as sample abrasive articles S12-S14, except that comparison sample abrasive article CS4 was formed using untreated (i.e., non-surface modified) AZ25 abrasive particles (i.e., abrasive particles having a composition of $Al_2O_3$ 75 wt %-$ZrO_2$ 25 wt %) within the organic bond component. In other words, the abrasive particles of comparison sample abrasive article CS4 did not include a tannic acid coating bonded to the surface of the abrasive particles.

Flexure strength of sample abrasive articles S12-S14 and comparison sample abrasive article CS4 was measured and recorded. Flexure strength was measured according to modified ASTM D2344/D2344M-00 under testing conditions summarized in Table 10 below:

TABLE 10

Flexure Strength Testing Conditions

| | |
|---|---|
| Dry condition: | Direct test within 24 h in the room (Temperature: about 25° C., Humidity: about 50%) |
| Apparatus: | Instron-5584 |
| Condition: | Load cell = 10 kN; Cross Head speed = 1.27 mm/m; Span area = 50.80 mm |
| Number of Measurements: | 6 pieces |

Flexure strength measurements were performed on six sample pieces of each sample abrasive articles S12-S14 and comparison sample abrasive article CS4. The six measurements were then averaged and summarized in Table 11 below:

TABLE 11

Flexure Strength

| SAMPLE | Flexure Strength (MPa) | Std. Deviation (MPa) |
|---|---|---|
| CS4 | 32.79 | 1.77 |
| S12 | 47.00 | 1.81 |
| S13 | 44.62 | 2.34 |
| S14 | 45.89 | 2.60 |

Figure 7:
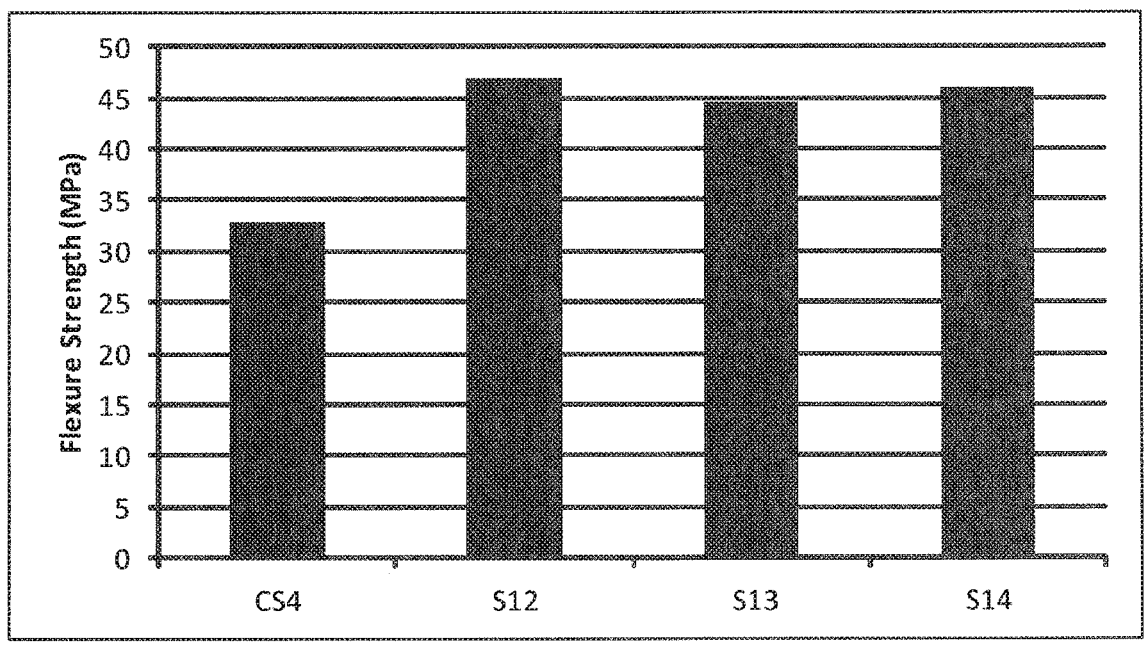
FIG. 7 includes a plot comparing the flexure strength of sample abrasive articles formed according to embodiments described herein with a comparison sample abrasive article.

FIG. 7 illustrates a plot of the flexure strength for each sample abrasive article S12-S14 and comparison abrasive article CS4.

Example 5

Sample abrasive articles S15-S17 were formed according to embodiments described herein. Specifically, sample abrasive articles S15-S17 each include surface modified abrasive particles within an organic bond component. Each sample abrasive article S15-S17 was formed by mixing surface modified AZ40 abrasive particles (i.e., abrasive particles having a composition of $Al_2O_3$ 60 wt %-$ZrO_2$ 40 wt %) in a phenolic resin precursor mixture followed by pressing the mixture into 51.6 mm×12.6 mm×11.0 mm pieces and then curing them from room temperature to 200° C.

The surface modified abrasive particles included in each sample abrasive article S15-S17 were formed by immersing core abrasive particles in different tannic acid coating solutions for 24 hours. Each respective tannic acid solution was prepared by dissolving various amounts of tannic acid coating material in Bis-tris-HCL buffer solution. After soaking in the respective tannic acid solutions for 24 hours, the surface modified abrasive particles were filtered, washed in deionized water and dried at 60° C. in a vacuum oven for 24 hours.

The respective tannic acid solution concentrations used to form the surface modified abrasive particles for each sample abrasive article S15-S17 are summarized in Table 12 below:

TABLE 12

Tannic Acid Concentration

| SAMPLE | Tannic Add Solution Concentration (g/L) |
|---|---|
| S15 | 0.1 |
| S16 | 0.5 |
| S17 | 1.0 |

For purposes of comparison, a comparison sample abrasive article CS5 was formed. Comparison sample abrasive article CS5 was formed in the same way as sample abrasive articles S15-S17, except that comparison sample abrasive article CS5 was formed using untreated (i.e., non-surface modified) AZ40 abrasive particles (i.e., abrasive particles having a composition of $Al_2O_3$ 60 wt %-$ZrO_2$ 40 wt %) within the organic bond component. In other words, the abrasive particles of comparison sample abrasive article CS5 did not include a tannic acid coating bonded to the surface of the abrasive particles.

Flexure strength of sample abrasive articles S15-S17 and comparison sample abrasive article CS5 was measured and recorded. Flexure strength was measured according to modified ASTM D2344/D2344M-00 under testing conditions summarized in Table 13 below:

TABLE 13

Flexure Strength Testing Conditions

| | |
|---|---|
| Dry condition: | Direct test within 24 h in the room (Temperature: about 25° C., Humidity: about 50%) |
| Apparatus: | Instron-5584 |
| Condition: | Load cell = 10 kN; Cross Head speed = 1.27 mm/m; Span area = 50.80 mm |
| Number of Measurements: | 6 pieces |

Flexure strength measurements were performed on six sample pieces of each sample abrasive articles S15-S17 and comparison sample abrasive article CS5. The six measurements were then averaged and summarized in Table 14 below:

TABLE 14

Flexure Strength

| SAMPLE | Flexure Strength (MPa) | Std. Deviation (MPa) |
|---|---|---|
| CS5 | 36.86 | 2.00 |
| S15 | 46.82 | 1.39 |
| S16 | 50.32 | 2.02 |
| S17 | 49.86 | 1.48 |

Figure 8:
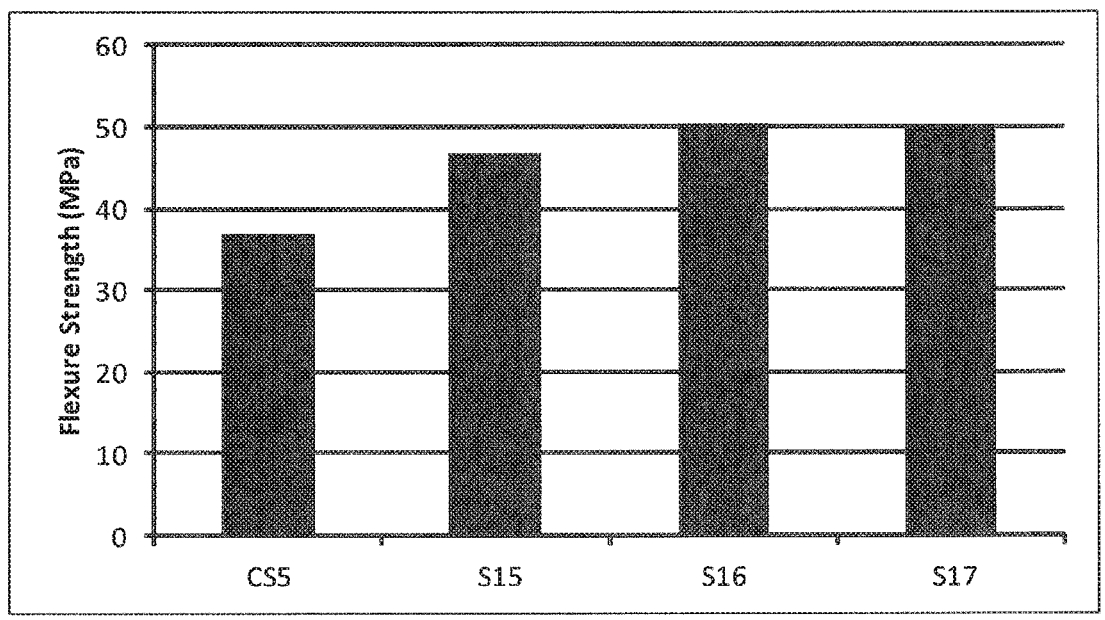
FIG. 8 includes a plot comparing the flexure strength of sample abrasive articles formed according to embodiments described herein with a comparison sample abrasive article.

FIG. 8 illustrates a plot of the flexure strength for each sample abrasive article S15-S17 and comparison abrasive article CS5.

Example 6

Sample abrasive articles S18-S20 were formed according to embodiments described herein. Specifically, sample abrasive articles S18-S20 each include surface modified abrasive particles within an organic bond component. Each sample abrasive article S18-S20 was formed by mixing surface modified monocrystalline alumina abrasive particles (i.e., MA88K monocrystalline alumina abrasive particles) in a phenolic resin precursor mixture followed by pressing the mixture into 51.6 mm×12.6 mm×11.0 mm pieces and then curing them from room temperature to 200° C.

The surface modified abrasive particles included in each sample abrasive article S18-S20 were formed by immersing core abrasive particles in different pyrogallic acid coating solutions for 24 hours. Each respective pyrogallic acid solution was prepared by dissolving various amounts of pyrogallic acid coating material in Bis-tris-HCL buffer solution. After soaking in the respective pyrogallic acid solutions for 24 hours, the surface modified abrasive particles were filtered, washed in deionized water and dried at 60° C. in a vacuum oven for 24 hours.

The respective pyrogallic acid solution concentrations used to form the surface modified abrasive particles for each sample abrasive article S18-S20 are summarized in Table 15 below:

TABLE 15

Pyrogallic Acid Concentration

| SAMPLE | Pyrogallic Acid Solution Concentration (g/L) |
|---|---|
| S18 | 0.1 |
| S19 | 0.5 |
| S20 | 1.0 |

For purposes of comparison, a comparison sample abrasive article CS6 was formed. Comparison sample abrasive article CS6 was formed in the same way as sample abrasive articles S18-S20, except that comparison sample abrasive article CS6 was formed using untreated (i.e., non-surface modified) monocrystalline alumina abrasive particles (i.e., MA88K monocrystalline alumina abrasive particles) within the organic bond component. In other words, the abrasive particles of comparison sample abrasive article CS6 did not include a pyrogallic acid coating bonded to the surface of the abrasive particles.

Flexure strength of sample abrasive articles S18-S20 and comparison sample abrasive article CS6 was measured and recorded. Flexure strength was measured according to modified ASTM D2344/D2344M-00 under testing conditions summarized in Table 16 below:

TABLE 16

Flexure Strength Testing Conditions

| | |
|---|---|
| Dry condition: | Direct test within 24 h in the room (Temperature: about 25° C., Humidity: about 50%) |
| Apparatus: | Instron-5584 |
| Condition: | Load cell = 10 kN; Cross Head speed = 1.27 mm/m; Span area = 50.80 mm |
| Number of Measurements: | 6 pieces |

Flexure strength measurements were performed on six sample pieces of each sample abrasive articles S18-S20 and comparison sample abrasive article CS6. The six measurements were then averaged and summarized in Table 17 below:

TABLE 17

Flexure Strength

| SAMPLE | Flexure Strength (MPa) | Std. Deviation (MPa) |
|---|---|---|
| CS6 | 41.31 | 2.31 |
| S18 | 49.61 | 2.88 |
| S19 | 48.25 | 1.67 |
| S20 | 50.05 | 2.35 |

Figure 9:
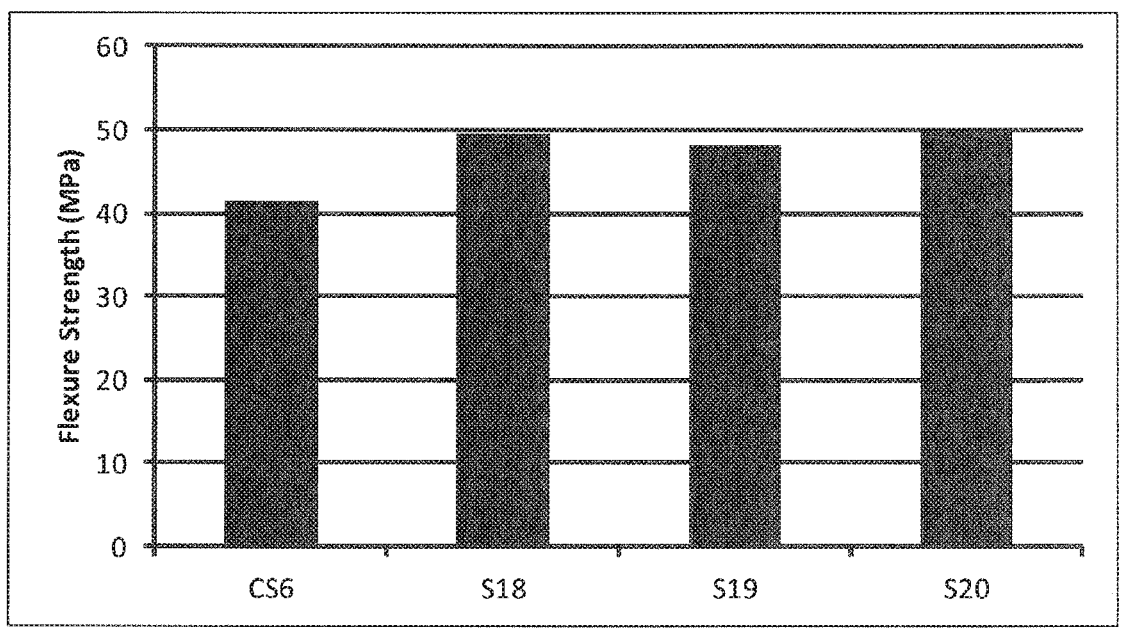
FIG. 9 includes a plot comparing the flexure strength of sample abrasive articles formed according to embodiments described herein with a comparison sample abrasive article.

FIG. 9 illustrates a plot of the flexure strength for each sample abrasive article S18-S20 and comparison abrasive article CS6.

Example 7

Sample abrasive articles S21-S23 were formed according to embodiments described herein. Specifically, sample abrasive articles S21-S23 each include surface modified abrasive particles within an organic bond component. Each sample abrasive article S21-S23 was formed by mixing surface modified AZ25 abrasive particles (i.e., abrasive particles having a composition of $Al_2O_3$ 75 wt %-$ZrO_2$ 25 wt %) in a phenolic resin precursor mixture followed by pressing the mixture into 51.6 mm×12.6 mm×11.0 mm pieces and then curing them from room temperature to 200° C.

The surface modified abrasive particles included in each sample abrasive article S9-S11 were formed by immersing core abrasive particles in different pyrogallic acid coating solutions for 24 hours. Each respective pyrogallic acid solution was prepared by dissolving various amounts of pyrogallic acid coating material in Bis-tris-HCL buffer solution. After soaking in the respective pyrogallic acid solutions for 24 hours, the surface modified abrasive particles were filtered, washed in deionized water and dried at 60° C. in a vacuum oven for 24 hours.

The respective pyrogallic acid solution concentrations used to form the surface modified abrasive particles for each sample abrasive article S21-S23 are summarized in Table 18 below:

TABLE 18

| | Pyrogallic Acid Concentration |
| --- | --- |
| SAMPLE | Pyrogallic Acid Solution Concentration (g/L) |
| S21 | 0.1 |
| S22 | 0.5 |
| S23 | 1.0 |

For purposes of comparison, a comparison sample abrasive article CS7 was formed. Comparison sample abrasive article CS7 was formed in the same way as sample abrasive articles S21-S23, except that comparison sample abrasive article CS7 was formed using untreated (i.e., non-surface modified) AZ25 abrasive particles (i.e., abrasive particles having a composition of $Al_2O_3$ 75 wt %-$ZrO_2$ 25 wt %) within the organic bond component. In other words, the abrasive particles of comparison sample abrasive article CS7 did not include a pyrogallic acid coating bonded to the surface of the abrasive particles.

Flexure strength of sample abrasive articles S21-S23 and comparison sample abrasive article CS7 was measured and recorded. Flexure strength was measured according to modified ASTM D2344/D2344M-00 under testing conditions summarized in Table 19 below:

TABLE 19

| | Flexure Strength Testing Conditions |
| --- | --- |
| Dry condition: | Direct test within 24 h in the room (Temperature: about 25° C., Humidity: about 50%) |
| Apparatus: | Instron-5584 |
| Condition: | Load cell = 10 kN; Cross Head speed = 1.27 mm/m; Span area = 50.80 mm |
| Number of Measurements: | 6 pieces |

Flexure strength measurements were performed on six sample pieces of each sample abrasive articles S21-S23 and comparison sample abrasive article CS7. The six measurements were then averaged and summarized in Table 20 below:

TABLE 20

| | Flexure Strength | |
| --- | --- | --- |
| SAMPLE | Flexure Strength (MPa) | Std. Deviation (MPa) |
| CS7 | 32.79 | 1.77 |
| S21 | 47.21 | 2.93 |
| S22 | 48.29 | 2.28 |
| S23 | 46.78 | 3.58 |

Figure 10:
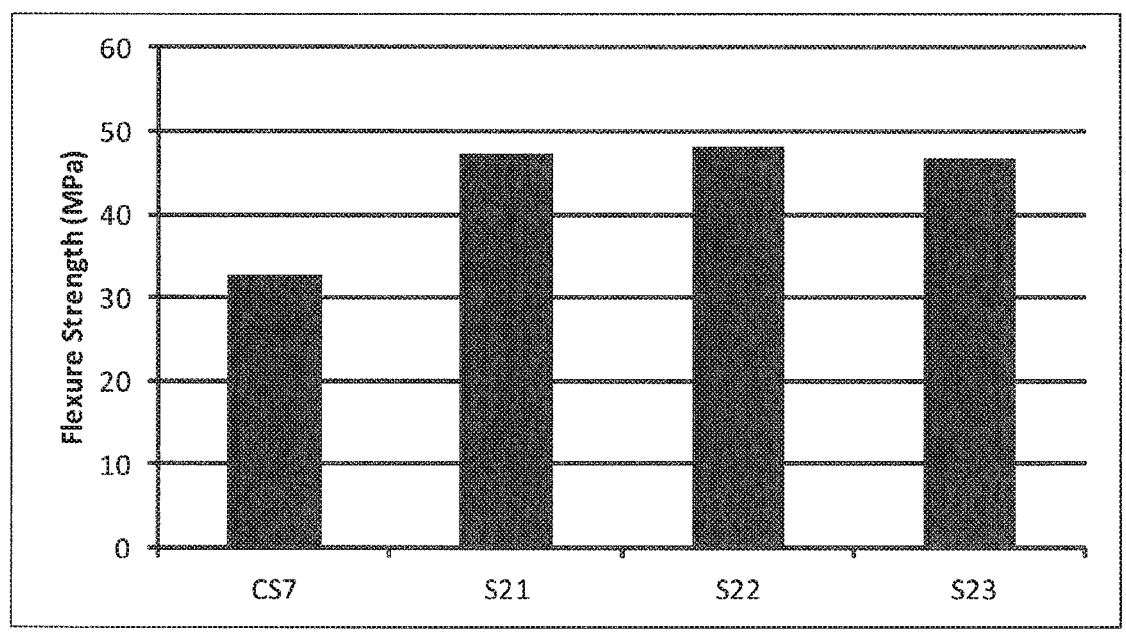
FIG. 10 includes a plot comparing the flexure strength of sample abrasive articles formed according to embodiments described herein with a comparison sample abrasive article.

FIG. 10 illustrates a plot of the flexure strength for each sample abrasive article S21-S23 and comparison abrasive article CS7.

Example 8

Sample abrasive articles S24-S26 were formed according to embodiments described herein. Specifically, sample abrasive articles S24-S26 each include surface modified abrasive particles within an organic bond component. Each sample abrasive article S24-S26 was formed by mixing surface modified AZ40 abrasive particles (i.e., abrasive particles having a composition of $Al_2O_3$ 60 wt %-$ZrO_2$ 40 wt %) in a phenolic resin precursor mixture followed by pressing the mixture into 51.6 mm×12.6 mm×11.0 mm pieces and then curing them from room temperature to 200° C.

The surface modified abrasive particles included in each sample abrasive article S24-S26 were formed by immersing core abrasive particles in different pyrogallic acid coating solutions for 24 hours. Each respective pyrogallic acid solution was prepared by dissolving various amounts of pyrogallic acid coating material in Bis-tris-HCL buffer solution. After soaking in the respective pyrogallic acid solutions for 24 hours, the surface modified abrasive particles were filtered, washed in deionized water and dried at 60° C. in a vacuum oven for 24 hours.

The respective pyrogallic acid solution concentrations used to form the surface modified abrasive particles for each sample abrasive article S24-S26 are summarized in Table 21 below:

TABLE 21

| | Pyrogallic Acid Concentration |
| --- | --- |
| SAMPLE | Pyrogallic Acid Solution Concentration (g/L) |
| S24 | 0.1 |
| S25 | 0.5 |
| S26 | 1.0 |

For purposes of comparison, a comparison sample abrasive article CS8 was formed. Comparison sample abrasive article CS8 was formed in the same way as sample abrasive articles S24-S26, except that comparison sample abrasive article CS8 was formed using untreated (i.e., non-surface modified) AZ40 abrasive particles (i.e., abrasive particles having a composition of $Al_2O_3$ 60 wt %-$ZrO_2$ 40 wt %) within the organic bond component. In other words, the abrasive particles of comparison sample abrasive article CS8 did not include a pyrogallic acid coating bonded to the surface of the abrasive particles.

Flexure strength of sample abrasive articles S24-S26 and comparison sample abrasive article CS8 was measured and recorded. Flexure strength was measured according to modified ASTM D2344/D2344M-00 under testing conditions summarized in Table 22 below:

TABLE 22

| | Flexure Strength Testing Conditions |
| --- | --- |
| Dry condition: | Direct test within 24 h in the room (Temperature: about 25° C., Humidity: about 50%) |
| Apparatus: | Instron-5584 |
| Condition: | Load cell = 10 kN; Cross Head speed = 1.27 mm/m; Span area = 50.80 mm |
| Number of Measurements: | 6 pieces |

Flexure strength measurements were performed on six sample pieces of each sample abrasive articles S24-S26 and comparison sample abrasive article CS8. The six measurements were then averaged and summarized in Table 23 below:

TABLE 23

| | Flexure Strength | |
|---|---|---|
| SAMPLE | Flexure Strength (MPa) | Std. Deviation (MPa) |
| CS8 | 36.86 | 2.00 |
| S24 | 52.97 | 2.02 |
| S25 | 53.25 | 3.00 |
| S26 | 47.79 | 4.15 |

Figure 11:
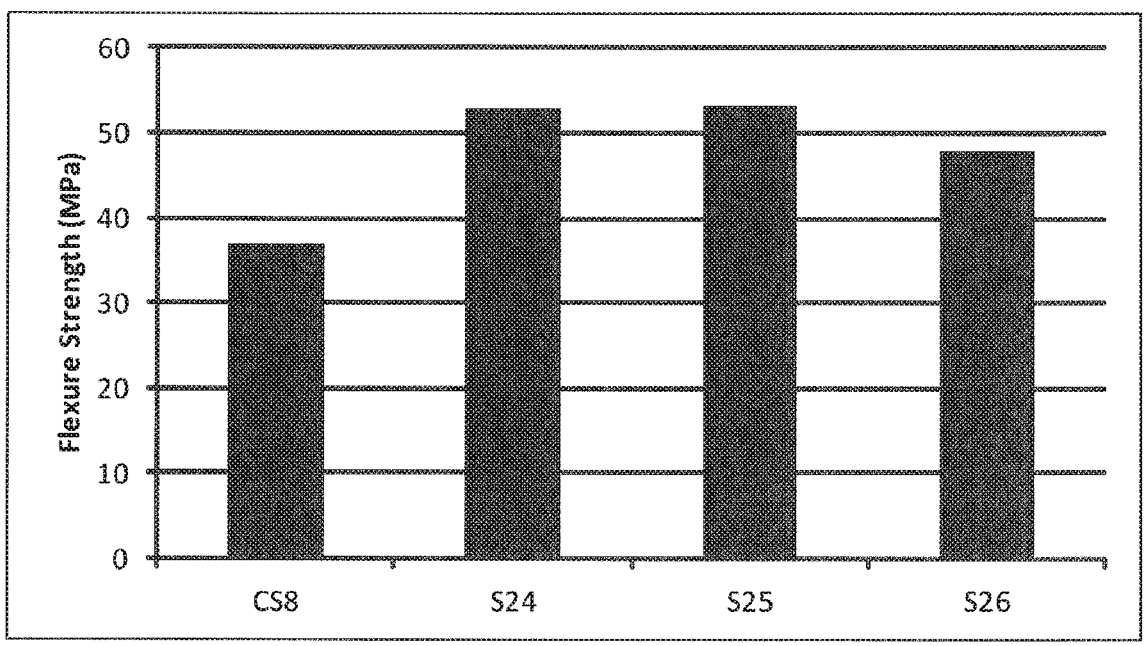
FIG. 11 includes a plot comparing the flexure strength of sample abrasive articles formed according to embodiments described herein with a comparison sample abrasive article.

FIG. 11 illustrates a plot of the flexure strength for each sample abrasive article S24-S26 and comparison abrasive article CS8.

Example 9

Sample surface modified abrasive particles SP1 were formed according to embodiments described herein by immersing core abrasive particles in a tannic acid coating solution. The core abrasive particles were monocrystalline alumina abrasive particles (i.e., MA88K monocrystalline alumina abrasive particles). The tannic acid coating solution was prepared by dissolving tannic acid in deionized water. The concentration of tannic acid coating material in the solution was 1 g/L. After soaking in the tannic acid coating solution for 24 hours, the surface modified abrasive particles were filtered, washed in deionized water and dried at 60° C. in a vacuum oven for 24 hours.

For purposes of comparison, comparison samples of raw tannic acid material CS9 and dried tannic acid CS10 were prepared. Comparison sample CS9 was dried tannic acid material. CS10 was formed by dissolving tannic acid in deionized water. The concentration of the tannic acid coating material in the solution was 1 g/L. The tannic acid solution was filtered and dried under 80° C. for 72 hours.

For purposes of analysis, a sample of about 0.2 grams of each of the surface modified abrasive particles SP1 and comparison samples CS9 and CS10, was dissolved in 1 ml 0.5M NaOH solution and hydrolyzed under ultra sonication for 10 min. The solution was centrifuged and the supernatant was injected for LC/MS analysis to obtain the molecular weight information. Analysis was conducted using the parameters and equipment summarized in Table 24 below.

TABLE 24

| | LC/MS Testing Parameters/Equipment | | | |
|---|---|---|---|---|
| Instrument: | Agilent 1290 Infinity ll with Agilent 6460 mass detector | | | |
| Column: | Poroshell 120SB-C18, 2.1 × 100 mm × 2.7 um; temperature: 35° C. | | | |
| Mobile Phase: | A. 5 mM/L Ammonium Formate in Water; B. 5 mM/L Ammonium Formate in Methanol | | | |
| Phase Schedule: | Time (min) | Eluent A (%) | Eluent B (%) | Flow rate (ml/min) |
| | 0 | 80 | 20 | 0.3 |
| | 2 | 80 | 20 | 0.3 |
| | 10 | 10 | 90 | 0.3 |
| MS Parameter: | ESI(—), 80-1500 amu | | | |

Figure 12A:
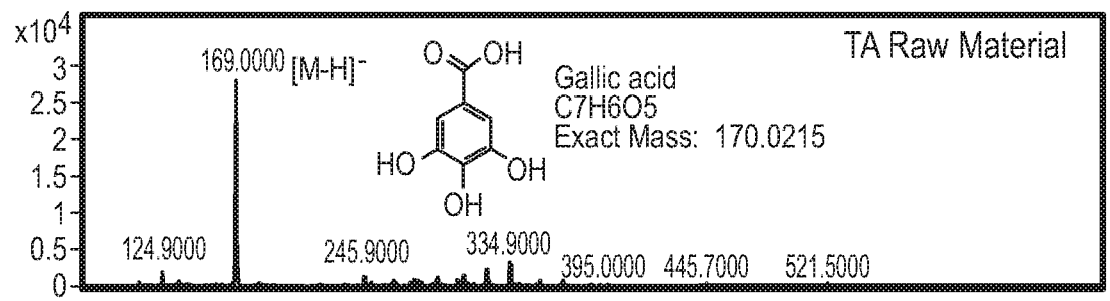
FIGS. 12a-12c includes a plot comparing the flexure strength of sample abrasive articles formed according to embodiments described herein with a comparison sample abrasive article.
Figure 12B:
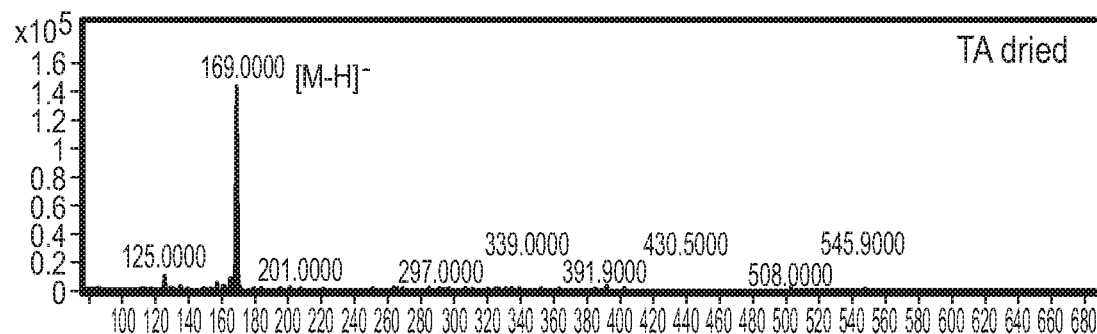
Figure 12C:
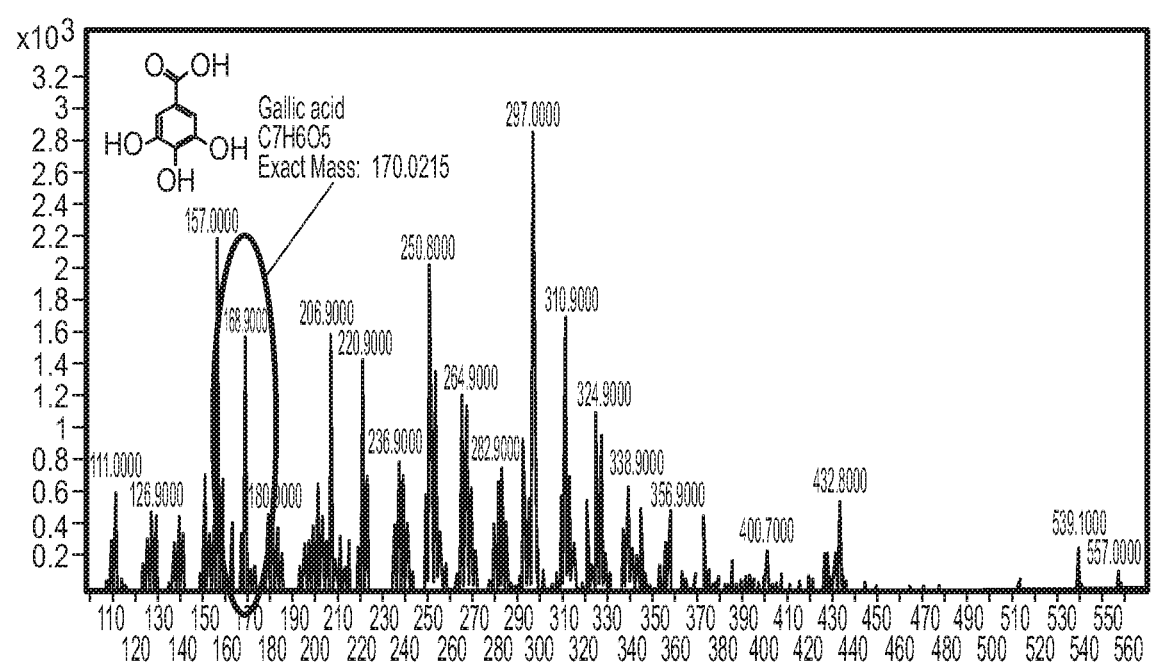

FIGS. 12a-12c illustrate an MS spectrum s of samples CS9, CS10, and SP1, respectively. Comparison of the MS spectrums demonstrate the reaction of the tannic acid coating with the surface of the abrasive grains through the presence of gallic acid in the MS spectrum of sample SP1, which indicates that alkaline hydrolysis of the tannic acid has occurred when it forms a coating on the surface of the abrasive particles in SP1.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A surface modified abrasive particle comprising:
    a core abrasive particle having a median particle size of at least about 0.06 microns; and
    a coating material functionally connected to a surface of the core abrasive particle,
    wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

2. The surface modified abrasive particle or claim 1, wherein the core abrasive particle comprises alumina, zirconia, oxides, carbides, nitrides, borides, diamond, superabrasives, white alundum, brown alundum, microcrystalline alumina abrasive, fusedany alumina zirconia, silicon carbide, boron carbide, boron nitride, silica or combinations thereof.

3. The surface modified abrasive particle or claim 1, wherein the core abrasive particle comprises a median particle size (D50) of not greater than 40000 microns.

4. The surface modified abrasive particle or claim 1, wherein the core abrasive particle comprises a median particle size (D50) of at least 1 micron.

5. The surface modified abrasive particle or claim 1, wherein the coating material is covalently bonded to the surface of the core abrasive particle.

6. The surface modified abrasive particle or claim 1, wherein the coating material is functionally connected to the surface of the core abrasive particle through hydrogen bonding.

7. The surface modified abrasive particle or claim 1, wherein the coating material is functionally connected to the surface of the core abrasive particle through complexing of at least one catechol group of the coating material and metal ions of the core abrasive particle.

8. The surface modified abrasive particle or claim 1, wherein the coating material is a dopamine coating material.

9. The surface modified abrasive particle or claim 1, wherein a majority of the coating material is covalently bonded to the core abrasive particle via an oxygen linkage.

10. The surface modified abrasive particle or claim 1, wherein a majority of the coating material is covalently bonded to the core abrasive particle via an NH linkage.

11. An abrasive article comprising:
an organic bond component; and
abrasive particles within the organic bond component,
wherein at least one of the abrasive particles is a surface modified particle, and
wherein the surface modified abrasive particle comprises:
a core abrasive particle having a median particle size of at least about 0.06 microns; and
a coating material functionally connected to a surface of the core abrasive particle, wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

12. The abrasive article of claim 11, wherein the core abrasive particle comprises alumina, zirconia, oxides, carbides, nitrides, borides, diamond, superabrasives, white alundum, brown alundum, microcrystalline alumina abrasive, fusedany alumina zirconia, silicon carbide, boron carbide, boron nitride, silica or combinations thereof.

13. The abrasive article of claim 11, wherein the coating material is covalently bonded to the surface of the core abrasive particle.

14. The abrasive article of claim 11, wherein the coating material is functionally connected to the surface of the core abrasive particle through hydrogen bonding.

15. The abrasive article of claim 11, wherein the coating material is functionally connected to the surface of the core abrasive particle through complexing of at least one catechol group of the coating material and metal ions of the core abrasive particle.

16. The abrasive article of claim 11, wherein the organic bond material comprises a thermoset, thermoplastic, adhesive, a polyimides, polyamides, resins, aramids, epoxies, polyesters, polyurethanes, acetates, celluloses, and combinations thereof.

17. A method of forming an abrasive article, wherein the method comprises:
providing an organic bond component;
providing abrasive particles;
combining the organic bond component with the abrasive particles to for a green body; and
forming the green body into the abrasive article,
wherein at least one of the abrasive particles is a surface modified particle, and
wherein the surface modified abrasive particle comprises:
a core abrasive particle having a median particle size of at least about 0.06 microns; and
a coating material functionally connected to a surface of the core abrasive particle, wherein the coating material comprises a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

18. The method of claim 17, wherein the organic bond material comprises a thermoset, thermoplastic, adhesive, a polyimides, polyamides, resins, aramids, epoxies, polyesters, polyurethanes, acetates, celluloses, and combinations thereof.

19. The method of claim 17, wherein providing a surface modified abrasive particle comprises:
providing a unprocessed core abrasive particle; and
treating the surface of the unprocessed core abrasive particle with a solution comprising a compound selected from the group consisting of dopamine, tyrosine, dihydroxyphenylalanine, norepinephrine, epinephrine, normetanephrine, 3,4-dihydroxyphenylacetic acid, tannic acid, pyrogallic acid or combinations thereof.

20. The method of claim 19, wherein treating the surface of the unprocessed core abrasive particle with a solution comprising dopamine further comprises preparing polymerizing dopamine to form polydopamine.

* * * * *

UNITED STATES PATENT AND TRADEMARK OFFICE
CERTIFICATE OF CORRECTION

PATENT NO. : 10,556,321 B2
APPLICATION NO. : 16/013092
DATED : February 11, 2020
INVENTOR(S) : Aiyu Yan et al.

It is certified that error appears in the above-identified patent and that said Letters Patent is hereby corrected as shown below:

On the Title Page

Item (30), please delete "2017 1 0473836" and insert --201710473836.7--

In the Specification

Column 34, Line 24, please delete "Add" and insert --Acid--

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*